(12) United States Patent
Burns et al.

(10) Patent No.: US 11,783,647 B2
(45) Date of Patent: Oct. 10, 2023

(54) SYSTEM AND METHOD FOR SECURING, RELEASING, AND MANAGING INVENTORY

(71) Applicant: Skeleton Key Systems, LLC, Northfield, NJ (US)

(72) Inventors: Michael Burns, Margate, NJ (US); Adam Phillip Treiser, Washington, DC (US); Adam Green, Margate, NJ (US); Eric Goldberg, Linwood, NJ (US)

(73) Assignee: Skeleton Key Systems, LLC

( * ) Notice: Subject to any disclaimer, the term of this patent is extended or adjusted under 35 U.S.C. 154(b) by 436 days.

(21) Appl. No.: 16/229,652

(22) Filed: Dec. 21, 2018

(65) Prior Publication Data

US 2019/0213812 A1 Jul. 11, 2019

Related U.S. Application Data

(60) Provisional application No. 62/608,683, filed on Dec. 21, 2017.

(51) Int. Cl.
| | | |
|---|---|---|
| *G07C 9/00* | (2020.01) | |
| *G06Q 10/087* | (2023.01) | |
| *G06Q 30/0601* | (2023.01) | |
| *G06Q 20/40* | (2012.01) | |
| *G07F 17/12* | (2006.01) | |

(52) U.S. Cl.
CPC ....... *G07C 9/00182* (2013.01); *G06Q 10/087* (2013.01); *G06Q 20/4037* (2013.01); *G06Q 30/0635* (2013.01); *G07C 9/00309* (2013.01); *G07C 9/00571* (2013.01); *G07F 17/12* (2013.01)

(58) Field of Classification Search
CPC ... G06Q 30/0601–0645; G06Q 10/087; G06Q 30/0635; G07C 9/00182
USPC .............................................. 705/26.1–27.2
See application file for complete search history.

(56) References Cited

U.S. PATENT DOCUMENTS

| | | |
|---|---|---|
| 6,595,342 B1 | 7/2003 | Maritzen et al. |
| 8,368,536 B2 | 2/2013 | Fawcett et al. |
| 8,401,915 B1 | 3/2013 | Kim |
| 9,367,865 B2 | 6/2016 | Treiser et al. |
| 2004/0002897 A1 | 1/2004 | Vishik |

(Continued)

OTHER PUBLICATIONS

NRF Big Show 2016: InVue to Showcase Sales Enablement Solutions Designed to Help Retailers Balance Sales and the Customer Experience With Security and Store Aesthetics. Internet Wire Jan. 4, 2016: NA. (Year: 2016).*

*Primary Examiner* — Michael Misiaszek
(74) *Attorney, Agent, or Firm* — The Belles Group, P.C.

(57) ABSTRACT

The present invention is directed to a system, method, and apparatus for managing a packaging article secured via a locking unit alterable between a locked state and an unlocked state. An indication that a user desires to handle the article may be received and an authorization of the user to handle the article may be performed. An actuator may cause the locking unit to alter from the locked state to the unlocked state, for example, based on the user being authorized to handle the article. Based on the user desiring to purchase the article, inventory information of the article may be updated by decreasing the number of articles in inventory by the article purchased. An account of the user may be charged a cost of the article. An indication may be provided to the user that the article has been purchased.

19 Claims, 17 Drawing Sheets

(56) References Cited

U.S. PATENT DOCUMENTS

| | | |
|---|---|---|
| 2005/0209921 A1 | 9/2005 | Roberts et al. |
| 2008/0140509 A1 | 6/2008 | Amjadi |
| 2010/0082447 A1 | 4/2010 | Lin et al. |
| 2011/0082729 A1 | 4/2011 | Carvallo et al. |
| 2012/0271712 A1 | 10/2012 | Katzin et al. |
| 2012/0271715 A1 | 10/2012 | Morton et al. |
| 2012/0296770 A1 | 11/2012 | Lin et al. |
| 2013/0012126 A1 | 1/2013 | Fisher et al. |
| 2013/0024308 A1 | 1/2013 | Ramaswamy et al. |
| 2013/0046648 A1 | 2/2013 | Calman et al. |
| 2013/0059534 A1 | 3/2013 | Sobalvarro et al. |
| 2013/0061261 A1 | 3/2013 | Pakula |
| 2013/0080278 A1 | 3/2013 | Daily |
| 2013/0095755 A1 | 4/2013 | Moreton et al. |
| 2013/0132279 A1* | 5/2013 | Nordstrom ............. G06Q 20/18 705/44 |
| 2013/0144757 A1 | 6/2013 | Bauer et al. |
| 2014/0019241 A1* | 1/2014 | Treiser ............... G06Q 30/0609 705/14.53 |
| 2017/0124510 A1* | 5/2017 | Caterino .......... G06K 19/07758 |
| 2019/0333304 A1* | 10/2019 | Flynn ................... H04L 9/0861 |

\* cited by examiner

SYSTEM AND METHOD FOR SECURING, RELEASING, AND MANAGING INVENTORY

CROSS-REFERENCE TO RELATED APPLICATIONS

The present application claims the benefit of U.S. Provisional Patent Application Ser. No. 62/608,683, filed on Dec. 21, 2017, the entirety of which is incorporated herein by reference.

BACKGROUND OF THE INVENTION

Brick-and-mortar retail establishments offer a competitive advantage over online retailers by showcasing their products, for example, by providing an environment in which consumers can view, sample, touch and experience a product. Many of these retailers also provide consumers with the opportunity to test certain products, such as cameras, computers, and video games, prior to making a purchase. Similarly, clothing, sporting good, and big box retailers, among others, often allow consumers to try on items of interest in a changing room to see how the product looks and feels. Regardless of the exact method, it has become increasingly important for traditional brick-and-mortar retailers to enable and encourage consumers to interact with and test products in a fun, entertaining, interactive and exciting environment in order to complete a sale. The ability of brick-and-mortar retailers to provide consumers with an opportunity to interact with a product has become a critical competitive advantage, if executed properly.

However, many brick-and-mortar retailers struggle to balance the need to promote products through samples and live demonstrations while also protecting their inventory and products from damage, theft, and other loss. Many different types of locking mechanisms currently exist to secure consumer goods to or within retail establishments, which are otherwise accessible for consumers to access, touch, explore, investigate, experience and sample. For example, consumer electronic products are often physically secured to a display area by cables. Clothing, in turn, is often secured with the use of a radio-frequency identification (RFID) tag, which sounds an alarm or triggers an ink-based explosion when the consumer who is accessing the product removes it from a designated area within the retail establishment. Additionally, many items, ranging from firearms to even teeth whitening packets in a pharmacy, are secured by RFID tags and even further by devices such as a locked glass encasement.

These locking mechanisms, however, have many disadvantages. First, they often restrict and limit consumers' ability to access, touch, explore, investigate, experience and sample the products in a manner that provides an opportunity to truly test many of the product's features. Further, salespeople are often unable to service the volume of consumers who wish to test or sample a product that must be unlocked or removed from a locking mechanism. For example, a consumer wishing to try on a leather jacket secured to a hanger or display shelf at a department store must find a salesperson to remove the cable and disable the alarm. The salesperson must then wait while the consumer tries on the jacket and contemplates whether to purchase the item. With more expensive luxury goods, this process may take a substantial amount of time—time during which the salesperson is unable to service other consumers. When this happens, unattended consumers often get tired of waiting and, feeling neglected and frustrated by the lack of service, take their business elsewhere. This can leave a lasting negative impression on those consumers that is extremely costly and difficult to change.

SUMMARY OF THE INVENTION

These and other needs are satisfied by the present invention, which in one aspect is directed to systems and methods for preventing theft of articles such as merchandise at a retail store while providing consumers with increased access to the merchandise.

In an aspect, an article (e.g., a packaged article) may be secured via a locking unit. The locking unit may be alterable between a locked state and an unlocked state. An indication that a user desires to handle the article may be received. An authorization of the user to handle the article may be performed. The authorization of the user may be based on financial information of the user. An actuator may cause the locking unit to alter from the locked state to the unlocked state, for example, based on the user being authorized to handle the article. An indication of whether the user desires to purchase the article may be received. Based on the user desiring to purchase the article, one or more actions may be performed. For example, inventory information of the article may be updated, for example, by decreasing the number of articles in inventory by the article purchased. An account of the user may be charged a cost of the article. An indication may be provided to the user that the article has been purchased.

In an aspect, a plurality of locking units may be provided. Each of the plurality of locking units may be configured to hold a respective article and may be alterable between a locked state and an unlocked state. An indication that a user desires to return the article to at least one of the plurality of locking units may be received. The article may be returnable to one or more (e.g., any) of the plurality of locking units. It may be determined whether a correct article has been returned to the at least one of the plurality of locking units. An indication may be provided to the user that the correct article has been returned to the at least one of the plurality of locking units, for example, based on a determination that the correct article has been returned to the locking unit. Inventory information of the article may be updated by increasing the number of articles in inventory by the returned article.

In an aspect, digital access may be provided to an article. For example, a locking unit may be configured to secure the article in a locked state. The locking unit may be alterable between the locked state and an unlocked state. A digital key associated with the locking unit may be generated. The digital key may be configured to cause the locking unit to alter between the locked state and the unlocked state. The digital key may be assigned to a user, for example, based on a first event. The digital key may be un-assigned from the user, for example, based on a second event. The digital key may be provided to a portable electronic device of the user.

In an aspect, digital access may be provided to an article. For example, a locking unit may be configured to secure the article in a locked state. The locking unit may be alterable between the locked state and an unlocked state. A digital key associated with the article may be generated. The digital key may be configured to cause the locking unit to alter between the locked state and the unlocked state. The digital key may be assigned to a user based on a first event and/or unassigned from the user based on a second event. The digital key may be provided to a portable electronic device of the user.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
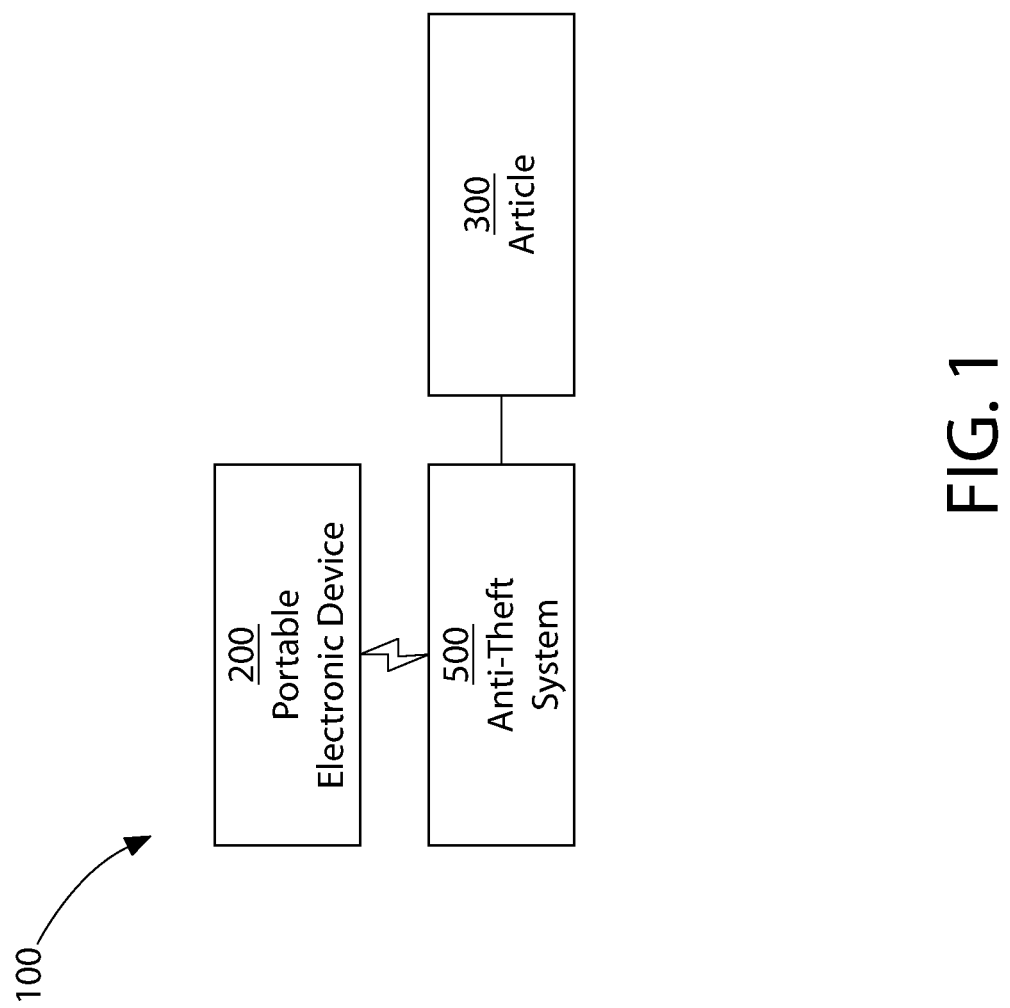
FIG. 1 is a schematic diagram of an example system for providing consumers with access to an article while preventing theft thereof.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g. code). Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Exemplary embodiments of the present invention are disclosed herein. Generally, these embodiments provide consumers with unrestricted access to articles (e.g., packaged articles) for sampling purposes in and around a retail environment, such as a store, without diminishing the store's ability to protect itself against theft or the loss of a sale. Further embodiments enable the retail store to retain up to date inventory information regarding articles while allowing the consumers to access the articles. Further still, embodiments allow a user (e.g., a consumer, store employee, etc.) to access articles from a location and return the article to any participating location. A digital authorization (e.g., digital key) may be assigned to a locking mechanism, which may allow for the efficient purchase, return, and/or management of inventory, as described herein.

It should be appreciated that there are many more embodiments with respect to the current invention and that, even with respect to the embodiments included, certain steps may not be necessary or even performed in the same order. Furthermore, a person skilled in the art would understand that while certain devices of the invention are described herein as containing specific components, those devices may include some of the components described, all of the components described, or additional components.

Referring first to FIG. 1, a system and method for providing users with access to an article. The users may be consumers, sellers, leasees, leasors, borrowers, lenders, etc. The article may be an item that is bought and/or sold. The article may be an item that is leased. The article may be an item that is lent out and/or borrowed. The article may be contained and/or coupled to a packaging, as described herein, although it is not necessary that the article be contained and/or coupled to a packaging. The article may be described herein as an article, a packaged article, a product, a packaged product, an item, or the like.

FIG. 1 illustrates a system 100 including a portable electronic device 200, an anti-theft system 500, and an article 300 that is operably coupled to, and in some instances secured by, the anti-theft system 500 or a component of the anti-theft system 500. As used herein, the article 300 may be any product or merchandise available for sale and/or leased from a retail establishment to a consumer. Non-limiting examples of articles 300 may include mobile phones, digital cameras, personal computers, laptop computers, televisions, autoportable electronics, other electronic devices, clothing, accessories, home goods, personal care items, furniture, office supplies, jewelry, bicycles, scooters, cars, and countless other consumer products. In examples, article 300 may be a room, such as a room that is leased (e.g., rented). It should be noted that the invention is not limited to the consumer products denoted herein, but may include any consumer product as understood in the art. Any product that can be purchased, leased, borrowed, etc., by another may be article 300.

Anti-theft system 500 may include, among other components, a locking mechanism 501 (see FIG. 3) that restricts or limits a consumer's ability to, or the manner and degree to which the consumer may access, touch, explore, investigate, experience or sample a consumer product, such as the article 300. The anti-theft system 500 (e.g., the locking mechanism 501 of the anti-theft system 500) may have a secured state and an unsecured state. The secured state may secure a consumer product such as the article 300 by preventing physical access to the article 300 by a consumer, by prohibiting certain actions with respect to the article 300, etc. The anti-theft system 500 (e.g., the locking mechanism 501) may secure the article 300 in the secured state and/or may release the article 300 in the unsecured state. As described herein, the locking mechanism 501 may also be referred to as a locking unit, a lock, or the like.

Locking mechanism 501 may be a physical device that restricts the movement of the article 300. For example the locking mechanism 501 may be a physical device that restricts a consumer's full access to a consumer product (e.g., article 300) when the locking mechanism 501 (or the anti-theft system 500) is in a secured state, and that releases the article 300 or otherwise enables a consumer to have full access to the article when the locking mechanism 501 (or the anti-theft system 500) is in an unsecured state, to enable the consumer to access, touch explore, investigate, experience and/or sample the article 300.

As illustrated in FIG. 1, the electronic portable device 200 may be in operable communication with the anti-theft system 500. In an example, the communication between the electronic portable device 200 and the anti-theft system 500 may be wireless, although the invention is not to be so limited and a hardwire connection between the electronic portable device 200 and the anti-theft system 500 can be used. The portable electronic device 200 may be used to provide information to the anti-theft system 500 so that the anti-theft system 500 can decide regarding whether to transition into an unsecured state to enable the consumer to have full access to the article 300. Information can be transmitted from the anti-theft system 500 to the portable electronic device 200, such as information about the article 300 that is secured by the anti-theft system 500. The communication between the portable electronic device 200 and the anti-theft system 500 may be a two-way communication, although the invention may not be so limited. For example, a single-way communication may also be contemplated.

Communication between the portable electronic device 200 and the anti-theft system 500 (e.g., locking mechanism 501) may be achieved via one or more forms of communication. For example, communication between the portable electronic device 200 and the anti-theft system 500 (e.g., locking mechanism 501) may be achieved via near field communication (NFC). The portable electronic device 200 can be equipped with NFC capabilities (e.g., an NFC enabled device) and the anti-theft system 500 can include an NFC tag, chip, sticker or the like. As a result, when the portable electronic device 200 is located within a certain distance of the anti-theft system 500, the portable electronic device 200 can read or scan the NFC tag or chip and access data or information provided by the NFC tag or chip, and the NFC tag or chip can access information from the portable electronic device 200. In certain embodiments, the distance between the portable electronic device 200 and the anti-theft system 500 that facilitates proper information transfer therebetween may be between 0-40 cm, between 15-30 cm, or between 20 cm. Although the above describes the communication between the devices being via NFC, the communication between the devices is not limited to NFC, as described herein.

Figure 2:
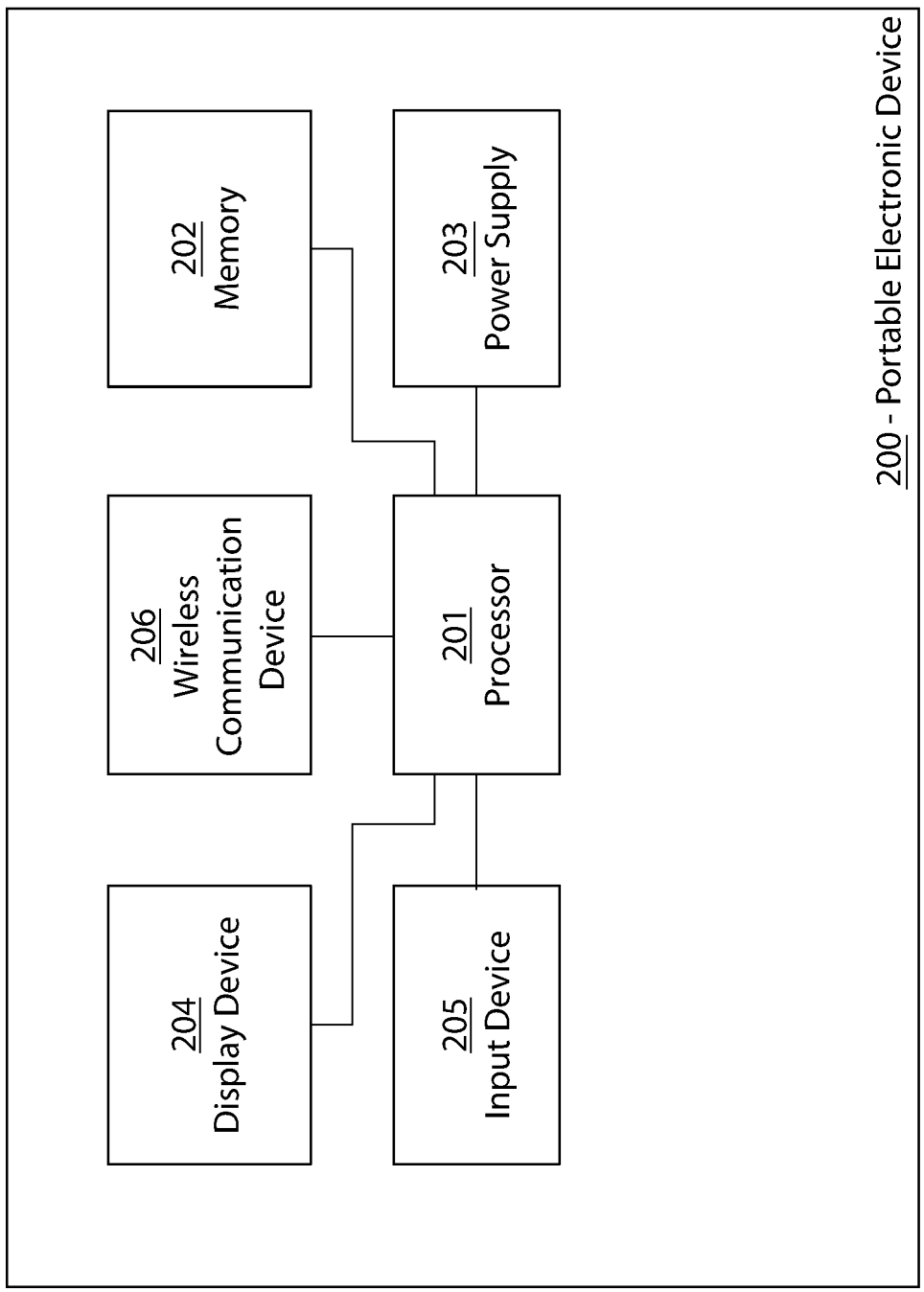
FIG. 2 is a schematic diagram of an example portable electronic device.

Referring to FIG. 2, an embodiment of the portable electronic device 200 is illustrated. The portable electronic device 200 can be one or more of a number of devices, including without limitation, a smart phone, a cell phone, a tablet computer, a personal digital assistant ("PDA"), a laptop computer, a near field communication (NFC) enabled credit or debit card, a Fob (such as those used as car keys and work and apartment building access keys), or any other portable electronic computing device that comprises and/or is connected to a wireless communication device, such an RFID tag/reader or NFC chip/tag.

In accordance with the illustrated embodiment, the portable electronic device 200 comprises a processor 201, a memory 202, a power supply 203, a display device 204, an input device 205 and a wireless communication device 206, all of which are in operable communication such as by being connected through the processor 201. The invention is not limited to the portable electronic device 200 having all the components illustrated in FIG. 2. The portable electronic device 200 may have more, or less, components than are illustrated.

Portable electronic device 200 may contain, or may have access to, substantial amounts and/or varying types of personal and other identifying information of the consumer, such as the consumer's name, phone number, address, email address, contact list, application downloads, Internet searching history, recent product purchases, criminal background, SIM card serial numbers, payment and bank account information, portable electronic wallets, the VIN of a car owned by the consumer as well as its make, model, year, and price, hardware and network consumer registration profiles, social media accounts, pictures, place of employment, and more. Information/data may be stored on the memory 202 of the portable electronic device 200 or on an external memory unit from which the portable electronic device 200 can access and retrieve the information/data such as any of the various servers or networks of servers that are referred to as being in the cloud. In certain embodiments the invention utilizes an application that resides on the portable electronic device 200 and the application has access to all the personal and identifying information of the consumer noted above, referred to herein collectively as consumer data, and more, such as by the consumer granting the application access to such information upon download.

Figure 3:
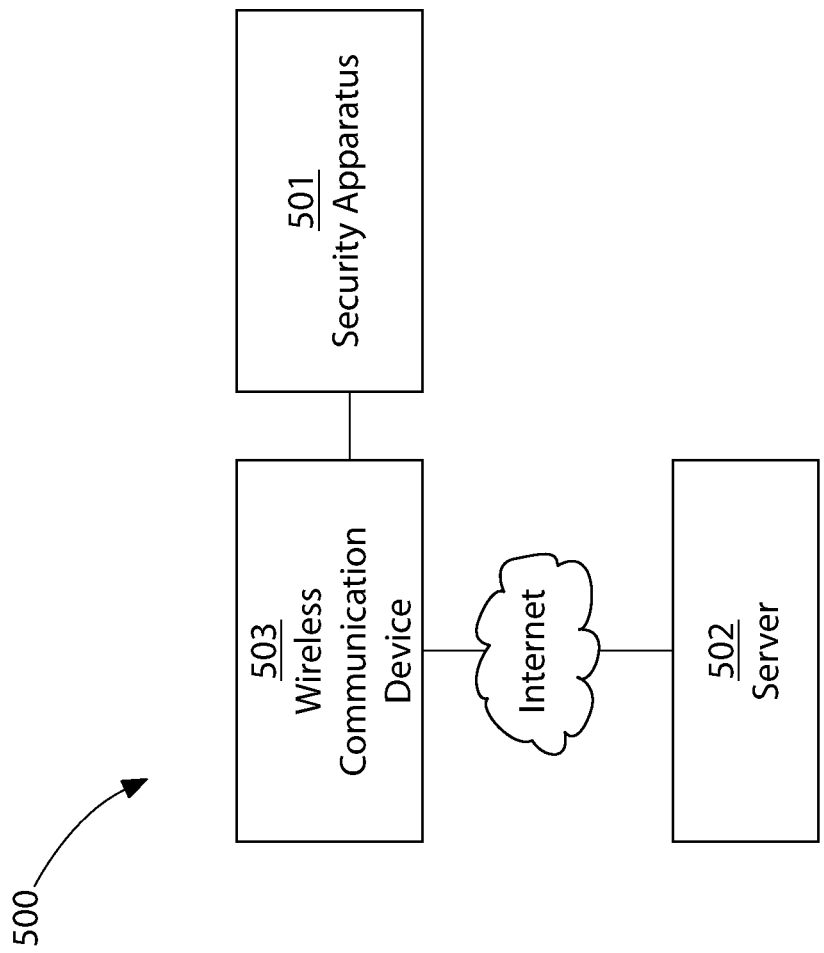
FIG. 3 is a schematic diagram of an anti-theft system.

The wireless communication device 206 may be any device that facilitates communication between the portable electronic device 200 and the anti-theft system 500 (including one or more components of the anti-theft system 500, as illustrated in FIG. 3 and discussed herein), such as NFC as discussed above. The wireless communication device 206 is not limited to being NFC enabled, and it may be, without limitation, an RFID tag/reader, NFC chip/tag, electromagnetic, Bluetooth, WI-FI, cellular, I/O, DIDO, infrared, and sonar technologies. In some embodiments, the portable electronic device 200 may have WI-FI capabilities in addition to one or more of the other technologies noted above. The anti-theft system 500 (e.g., the wireless communication device 503 of the anti-theft system 500) may be able to communicate with the portable electronic device 200 via RFID, NFC, RF, electromagnetic, Bluetooth, WI-FI, cellular, wireless USB, I/O, DIDO, infrared, and sonar technologies, among others, depending on the wireless technology contained by those devices.

Referring to FIG. 3, an example of the anti-theft system 500 is illustrated. The anti-theft system 500 may comprise a locking mechanism 501 for securing the article 300, a wireless communication device 503, and a server 502. The wireless communication device 503 may communicate wirelessly with the server 502, for example, via the Internet. The wireless communication device 503 and the server 502 may communicate via a hardwire connection, or not at all in certain other embodiments. The server 502 may not form a part of the anti-theft system 500 and may be a separate remote server that is in communication with the wireless communication device 503. The wireless communication device 503 may not be in operable communication with the server 502 at all. For example, upon communication being established between the portable electronic device 200 and the wireless communication device 503, the portable electronic device 200 may communicate wirelessly with the server 502.

The wireless communication device 503 may be directly affixed to the locking mechanism 501, directly affixed to the article 300, or may be a separate device having its own housing that is operably connected, either wirelessly or via a hardwire connection, to one of the locking mechanism 501 and the article 300, or both. The wireless communication device 503 can be, without limitation, an RFID tag/reader/sticker, NFC chip/tag/reader, electromagnetic, Bluetooth, WI-FI, cellular, I/O, DIDO, infrared, and sonar technologies. The wireless communication device 503 of the anti-theft system 500 may be able to wirelessly communicate with the wireless communication device 206 of the portable electronic device 200. As a result of communication between the portable electronic device 200 and the anti-theft system 500, the anti-theft system 500 may transition from a secured state to an unsecured state, the portable electronic device 200 may transfer information and data (e.g., consumer data related to the consumer) to the anti-theft system 500 (e.g., to the server 502, or to a remote server), and the anti-theft system 500 may transfer information and data (e.g., product data related to the article 300, marketing materials, coupons and the like) to the portable electronic device 200.

Figure 4:
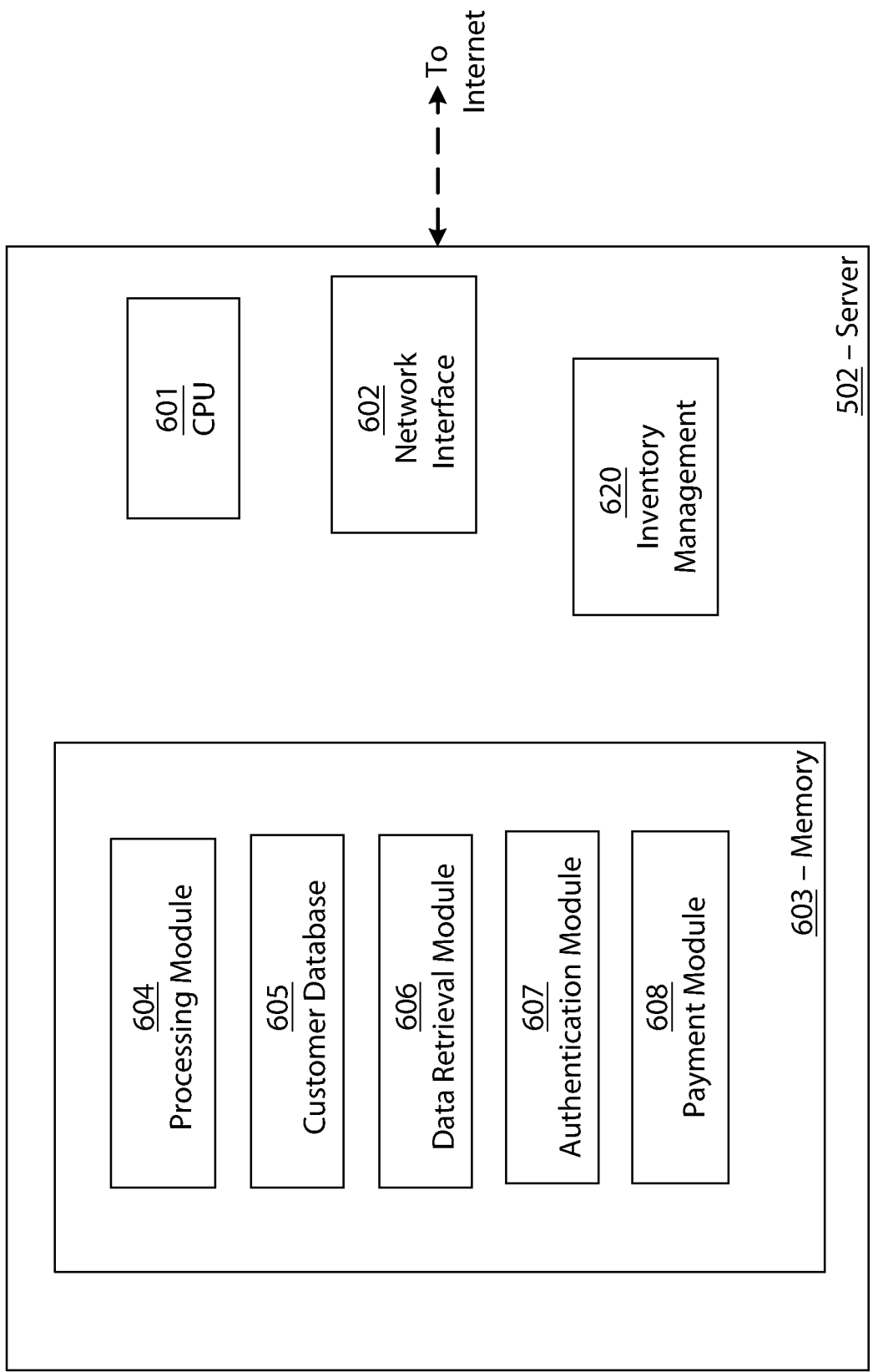
FIG. 4 is a schematic diagram of an example server.

Referring now to FIG. 4, one embodiment of a server 502 that can be used with the present invention will be described. In the exemplified embodiment, the server 502 comprises a properly programmed processor (CPU) 601, a network interface 602, and a memory unit 603. In the exemplified embodiment, the memory unit 603 comprises a processing module 604, a consumer database 605, a data retrieval module 606, an authentication module 607, and a payment module 608. Than all of the databases/modules can form a part of the server 502. For example, the server 502 may not include any of the modules and databases, and the modules and databases can instead be separate devices with which the server 502 is in operable communication.

The processing module 604 processes and organizes information provided to the server 502. The consumer database 605 may be a consumer relationship management database, a loyalty rewards program database, a database containing consumer data or information about each of the consumer's that have shopped (and some that have not) in the retail store, or the like. The data retrieval module 606 retrieves data from the portable electronic device 200 or from databases with which the server 502 is in operable communication.

In some examples the data retrieval module 606 may be an information unit and/or a detection unit. In such examples, the information unit may access article (e.g., packaged article) information. Article information may include information about the article, such as the name of the article, a brand of the article, a model of the article, a color of the article, a location of the article, etc. Article information may be updated upon an event (e.g., a purchase of the article and/or a return of the article). The information unit may access information related to the locking unit, such as location information of the locking unit. Information related to the locking unit may be updated, for example, based on an event (as described herein).

The detection unit may be configured to determine the state of the locking unit, such as whether the locking unit is in a locked state or an unlocked state. The locked state and/or the unlocked state of the locking unit may relate to a physical locking of the article. For example, the article may be secured via a physical lock, such as a hook or other physical mechanism. In other examples, the locked state and/or the unlocked state of the locking unit may relate to a virtual locking of article. For example, the article may be secured via a disabling and/or enabling of the article (e.g., a remote disabling or enabling of the article). The detection unit may be configured to determine whether the locking unit is associated with an article, holding an article, and/or details about how long the locking unit has been associated with the article and/or holding the article, details of the article of which the locking unit is associated/holding (e.g., the weight of the article, how long the locking unit has been holding the article, etc.).

The authentication module 607 may approve or disapprove of a user's risk level to instruct the anti-theft system 500 to either remain in the secured state or to transition into the unsecured state.

The payment module 608 may retrieve payment information from a consumer (or the consumer's portable electronic device 200) with which the server 502 is in communication. For example, the payment module 608 may retrieve payment information from a consumer so that payment for the article 300 can be made if desired, or if necessary (e.g., in the event of a theft).

The inventory management system 620 may store and/or update inventory information regarding products located in the store, for example. The inventory information may be updated upon purchase of one or more products, return of one or more products, and/or replenishment of one or more products.

Although exemplified as a single memory unit, it should be noted that the invention is not so limited and in other embodiments the server 502 may comprise more than one memory unit 603. Further, although exemplified as a single server, it should be noted that in alternate embodiments the server 502 may take the form of any number of operably connected and properly programmed servers. For example, as discussed in more detail below, the server 502 may be configured to receive, store, and/or disseminate information relating to the consumer, the article 300, the portable electronic device 200, and/or the anti-theft system 500. Further, although exemplified as in electronic communication with the wireless communication device 503 via the Internet in FIG. 3, it should be noted that the invention is not so limited and in alternate embodiments the server 502 may be operably connected to any of the other components of the system via other communication means, such as described herein. In embodiments, the server 502 is configured to perform the processes and functions described herein.

Further, although the above describes features with respect to a certain module or database of the server, any and/or each (including all) of the features above may be related to one or more of the modules and/or databases described above, or none of the modules and/or databases described above. The features may be performed in a module and/or database that is not described above. Further, the features may be performed outside of the server. For example, the features may be provided within a locking unit (such as locking unit 501), a hanging surface, a portable electronic device, an RFID reader, a weight scale, scanner, optical camera, etc. As an example, the detection unit may be an RFID reader, a weight scale, scanner, optical camera, etc.

Figure 5A:
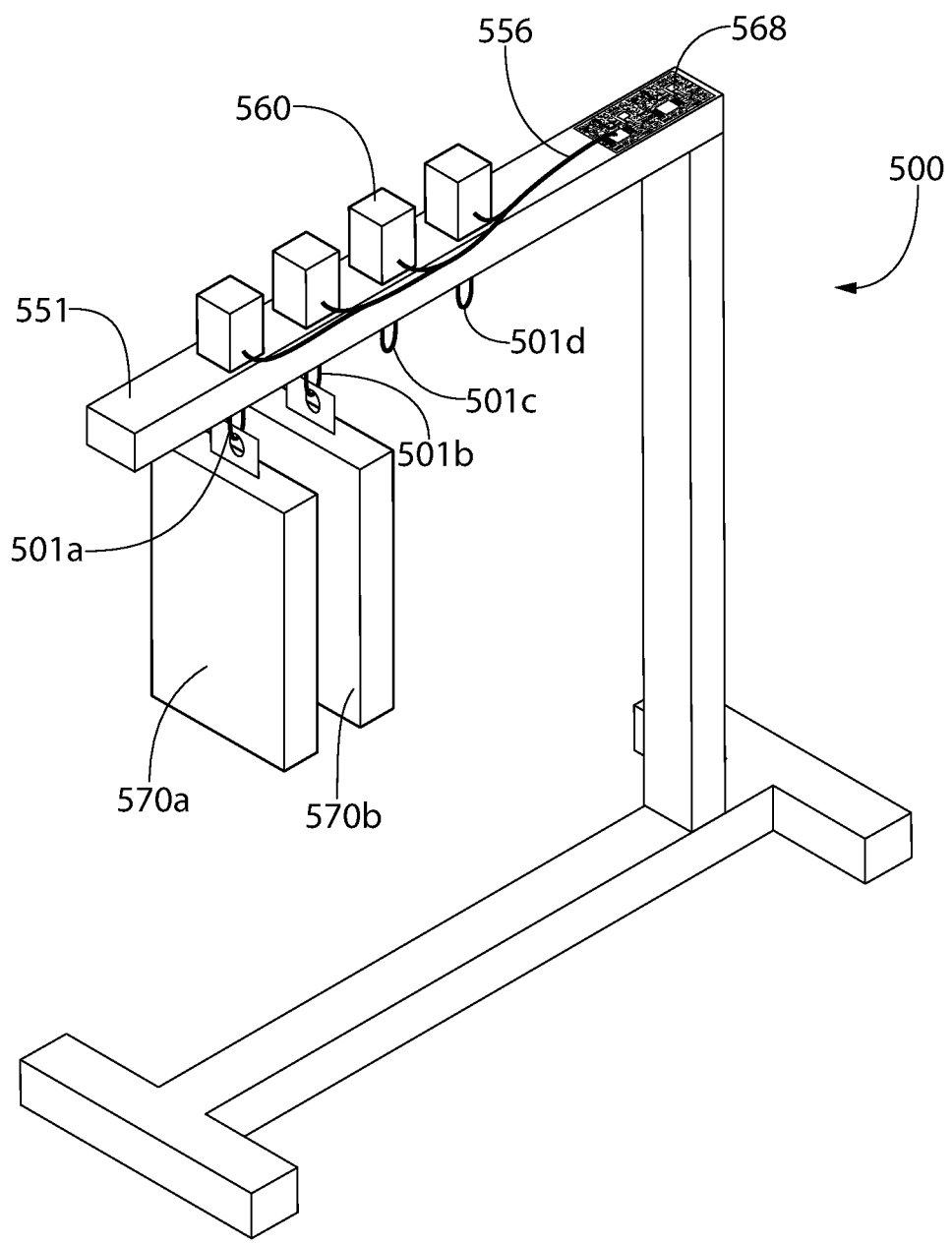
FIGS. 5A-5D are depictions of an example security system for permitting a consumer unrestricted access to an article.

Referring to FIGS. 5A-5D, an embodiment of the present invention will be described. Referring first to FIG. 5A, the invention will be described wherein the security system 500 includes locking mechanism 501. Locking mechanism 501 may be a hanging device, as described herein. For example, the locking mechanism 501 may include one or more hooks, such as peg hooks. Each of the hooks may be configured to support and/or secure an article (e.g., one article). Each of the hooks may be configured to support and/or secure an article that is contained in, or otherwise coupled to (e.g., using), a packaging. The packaging may be a peg hook packaging or any other packaging that is used to contain and/or couple to an article.

The locking mechanism 501 may include one or more poles, tongue and grooves, cables (e.g., wire cables), enclosures with releasable barriers, magnets, etc., that may be configured to support a product that is contained in or otherwise using a standard peg hook packaging. The one or more poles, tongue and grooves, cables (e.g., wire cables), enclosures with releasable barriers, magnets, etc. may be mounted to a surface (e.g., an arm). Locking mechanism 501 may secure a product, such as article 300, by coupling to a hanging surface, as described herein. In embodiments, when the locking mechanism 501 is locked, the packaging cannot be removed from the locking mechanism 501 without ripping the packaging.

Locking mechanism 501 may release a product, such as article 300, by de-coupling from the hanging surface. When the locking mechanism 501 is unlocked, the packaging can be readily removed from the locking mechanism 501 so that a consumer can handle, use, and/or purchase the product. In the exemplified embodiment, altering the locking mechanism 501 from the locked state to the unlocked state may include lowering the locking mechanism 501 until an end (e.g., a free end) of the locking mechanism 501 becomes exposed so that the packaging can be slid off the locking mechanism 501.

Locking unit may secure the article via a physical locking of the article, as described herein. For example, the article may be secured via a physical lock, such as a hook or other physical mechanism. Locking unit may secure the article via a virtual locking of the article. For example, the article may be secured via a disabling and/or enabling of the article (e.g., a remote disabling or enabling of the article).

As shown on FIG. 5A, hanging surface 551 may be an arm, such as an extending arm. Hanging surface may be comprised of one or more materials and in one or more form factors, such as plastic, metal, wire, tubing, rod, glass, etc. Hanging surface 551 may extend from another surface, such as a wall, pole, tube, wire, etc. In other examples, hanging surface 551 may not extend from another surface. For example, hanging surface 551 may be a wall that does not extend from another surface.

The locking mechanism 501 may be configured to hang the article 300. For example, the locking mechanism 501 may be configured to hang the article 300 from the hanging surface 551. The article 300 may include an aperture, slot, nub, etc., for hanging the article 300 via the locking mechanism 501. In other examples, the article 300 may include a packaging that may be used to hang the device. In such examples, the packaging may include an aperture, slot, nub, etc., for hanging the article 300.

The locking mechanism 501 may have an actuator, such as actuator 560. Actuator 560 may be hidden in a housing. Actuator 560 may be located on the hanging surface 551. In other examples the actuator 560 may not be hidden in a housing and/or may be remote from the hanging surface 551. Actuator 560 may have a secured state that causes the locking mechanism 501 to prevent a consumer's access to an article 300. Actuator 560 may cause one or more locking mechanisms to secure the article. Actuator may cause one (e.g., only one) locking mechanism 501 to secure the article. For example, actuator 560 may cause a locking mechanism 501 to be in a secured state, independent from one or more other locking mechanisms. Actuator 560 may cause the locking mechanism 501 to secure the article 300 by coupling the locking mechanism 501 to the hanging surface 561. The locking mechanism 501 (e.g., a hook) may be coupled the arm by raising the locking mechanism 501 until a free end of the locking mechanism 501 is coupled to the hanging surface 561.

The actuator 560 may have an unsecured state that causes the locking mechanism 501 to release the consumer article 300. The actuator 560 may release the article 300 by uncoupling the locking mechanism 501 from the hanging surface 561. The locking mechanism 501 (e.g., a hook) may be uncoupled from the hanging surface 561 by lowering the locking mechanism 501 from the hanging surface 561 until a free end of the locking mechanism 501 is uncoupled from the hanging surface 561.

Locking mechanism 501 may allow a consumer to view, handle, demonstrate, etc. the article 300 prior to purchasing the article 300 without human assistance. For example, the consumer may decouple article 300 from the locking mechanism 501 to view, handle, demonstrate, etc., the article 300. The consumer may have full access to the article 300 via a portable electronic device 200, such as a mobile phone or the like. For example, the consumer may place the portable electronic device 200 into proximity with the locking mechanism 501 in order to facilitate wireless communication therebetween.

The wireless communication device 502 may be coupled to the locking mechanism 501. Thus, upon placing the portable electronic device 200 in proximity with the locking mechanism 501 (or hardwired directly thereto), the portable electronic device 200 may also be in close proximity with the wireless communication device 502. When in proximity, the wireless communication device 502 and the portable electronic device 200 will be in operable communication with one another, either via NFC, RFID, Wi-Fi, or any of the other communication technologies discussed above. The wireless communication device 502 may transmit a signal to the server 502 through the Internet or any other network (e.g., local area network, metropolitan area network, wide area network) and/or may transmit consumer data to the server 502, including any identifying information about the consumer that the wireless communication device 503 can gather from the portable electronic device 200 (e.g., email address, name, address, phone number, social network accounts, payment accounts and the like as discussed above).

In certain embodiments, the server 502 may gather additional information about the consumer (e.g., consumer data) from remote databases. The server 502 may process the consumer data, computes a risk assessment using pre-programmed algorithms, and decide regarding whether the consumer's risk level should be approved. If the user's risk level is approved, the locking mechanism 501 is unlocked or transitioned into the unsecured state, the locking mechanism 501 is uncoupled (e.g., the hook is lowered), and the user can access the article 300. If the user's risk level is not approved, the locking mechanism 501 will remain in the secured state.

Although consumer data is transmitted to the server 502 from the wireless communication device 503, the invention is not to be so limited in all embodiments. For example, upon communication being established between the portable electronic device 200 and the wireless communication device 503, the portable electronic device 200 may communicate directly with the server 502 via the Internet or another network. During such communication, the server 502 may retrieve consumer data from the portable electronic device 200 (and/or from external databases) to enable the server 502 to make an approval or disapproval decision for releasing the locking mechanism 501 based on the consumer's risk level. If the server 502 decides that the consumer's risk level is approved, the server 502 will send an approval signal to the portable electronic device 200, and the portable electronic device 200 will transmit a signal to the wireless communication device 503 instructing the locking mechanism 501 to unlock. The flow of the transmission of data and information between the portable electronic device 200 and the components of the anti-theft system 500 (e.g., the locking mechanism 501, the wireless communication device 503 and the server 502) may be accomplished in a variety of ways. For example, all the server 502, the portable electronic device 200, and the wireless communication device 503 may be in operable communication, or only some of those components may be in operable communication.

Figure 5B:
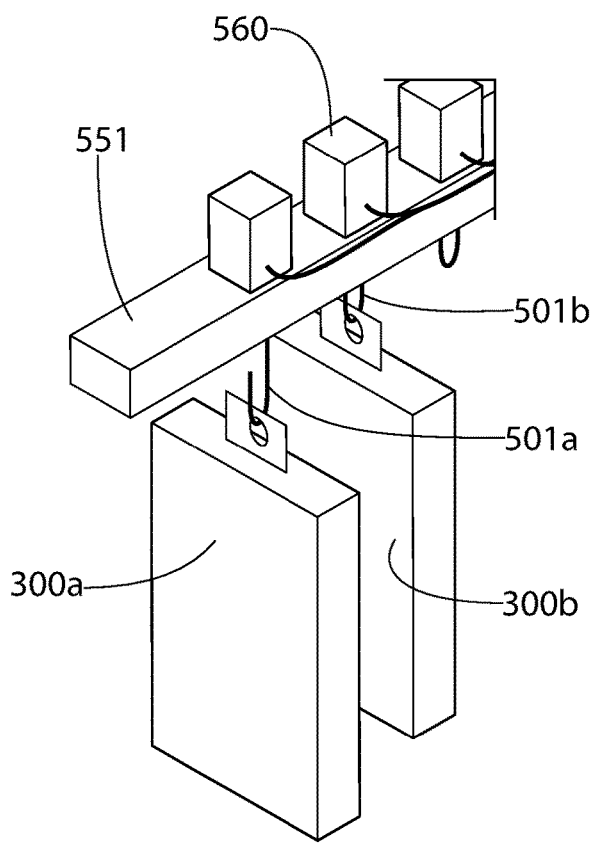
Figure 5C:
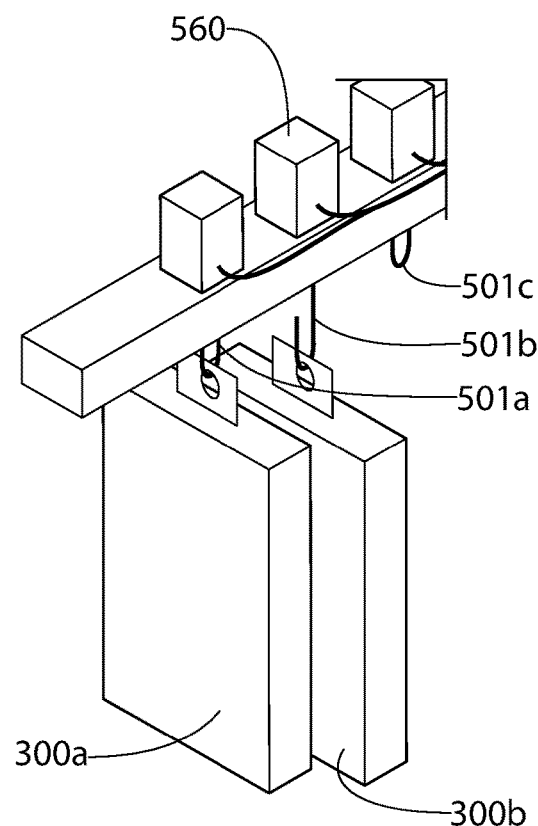
Figure 5D:
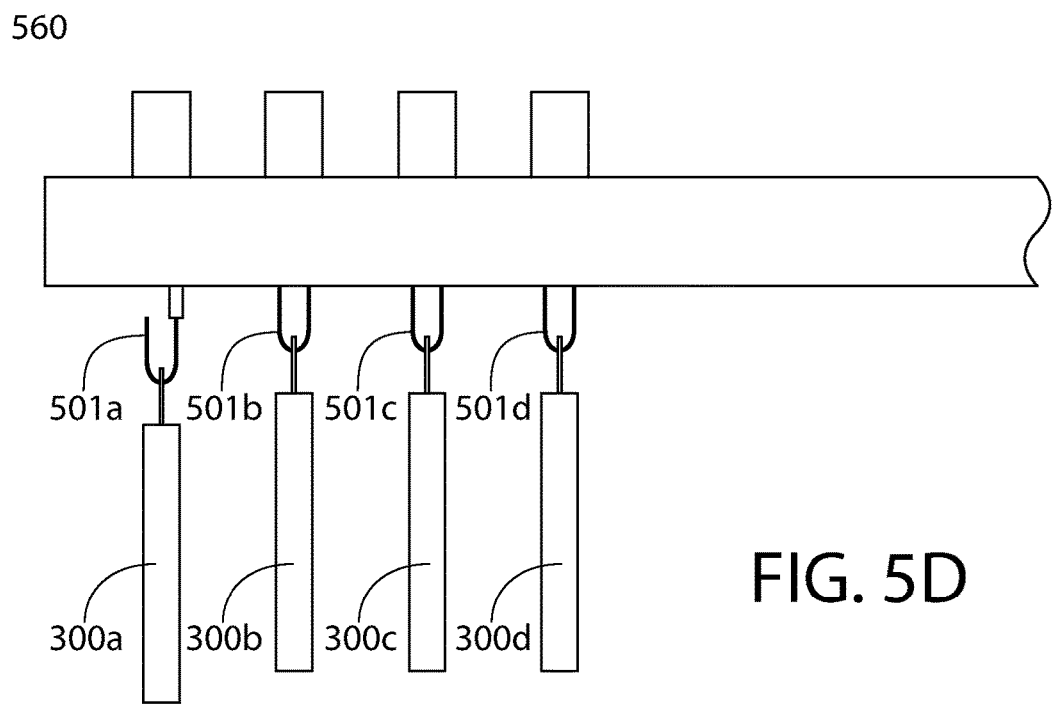

FIGS. 5B-5D show the security system 500 in which the different states (e.g., secured and unsecured) of the locking mechanism 501 is shown. As shown on FIGS. 5B-5D, hanging surface 551 may include one or more locking mechanisms, such as locking mechanisms 501a, 501b, 501c, 501d. Although FIGS. 5A-5D show the locking mechanisms 501a-501d as hooks, locking mechanisms 501a-501d may be one or more (including a combination of) hanging devices having one or more form factors, as described herein. The locking mechanism 501 is movably coupled to and decoupled from the hanging surface 551. All the locking mechanisms 501a-501d may be coupled to and decoupled from the hanging surface 551, for example, simultaneously. Each of the locking mechanisms 501a-501d may be coupled to and decoupled from the hanging surface 551, for example, independently.

As shown on FIGS. 5B-5D, a single apparatus (e.g., locking mechanism 501a in FIG. 5B and FIG. 5D; locking mechanism 501b in FIG. 5C) may be in an unsecured state while one or more of the other locking mechanisms (e.g., locking mechanism 501b in FIG. 5B; locking mechanism 501a in FIG. 5C; and locking mechanism 501b, 501c, 501d in FIG. 5D) may be in a secured state. In this example, the consumer can access an identified consumer article while being prevented access to other consumer articles.

Not all locking mechanisms 501 (e.g., within a single hanging surface 551) are required to be holding a consumer article. For example, as shown on FIG. 5B, while locking mechanisms 501a, 501b are holding a consumer article, locking mechanism 501c is not holding a consumer article. Further, the locking mechanisms may be holding consumer articles in any configuration. For example, while FIG. 5B shows the first two locking mechanisms 501a, 501b holding a consumer article, such configuration is not required. Locking mechanisms 501a and 501c may be holding consumer articles, locking mechanisms 501b and 501c may be holding consumer articles, etc.

Security system 500 may include one or more (e.g., a series of) onboard actuators 560 (e.g., servos, solenoids, etc.) which may be secured to the hanging surface 551. Each actuator 560 may be coupled (e.g., hardwired) to a chip, such as an onboard microchip 568. The microchip may communicate wirelessly throughout the network (between a mobile-based application and an external database). The microchip may communicate wirelessly throughout the network using transmitters and receivers which can be powered through hardwiring into an electrical system, or by battery.

Figure 6:
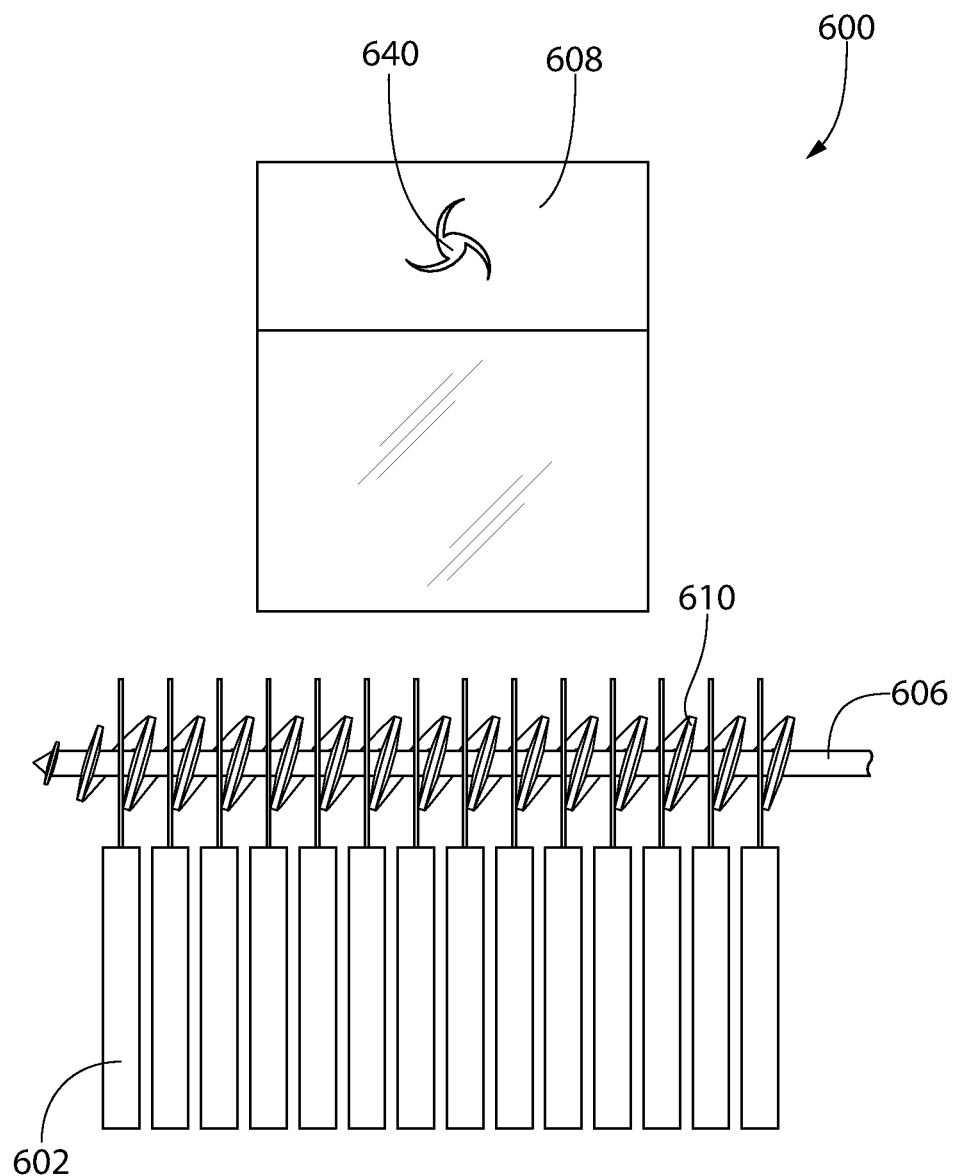
FIG. 6 is a depiction of an example security system using an auger mechanism for permitting a consumer unrestricted access to an article.

Referring now to FIG. 6, an alternative embodiment of a security system (system 600) for securing and/or releasing article 300 is illustrated. System 600 may include a locking mechanism, shown as auger apparatus 610. Auger apparatus 610 may be configured to secure and/or dispense consumer article 602. Auger apparatus 610 may be mounted to a surface, such as hanging surface 606 (e.g., shown as an arm). Hanging surface 606 may be any surface, as described herein.

In examples, the auger apparatus 610 may be secured to peg boards, hung from a traditional peg hook racking system, or the like. Consumer article 602 may be hung from the auger apparatus 610. As the front-most articles are released from security system 600, the next-most articles are moved to the front, for example, via auger apparatus 610. In some examples, the location information of the products may be updated as the auger apparatus 610 moves the articles. Packaging of consumer article 602 may be configured for use with the auger apparatus 610. An example of packaging 608, used for the auger mechanism, is shown on FIG. 6. For example, the packaging 608 may have an insert 640 for accepting auger apparatus 610. Packaging 608 may be configured to allow consumer article 602 to be moved via auger apparatus 610.

Figure 7:
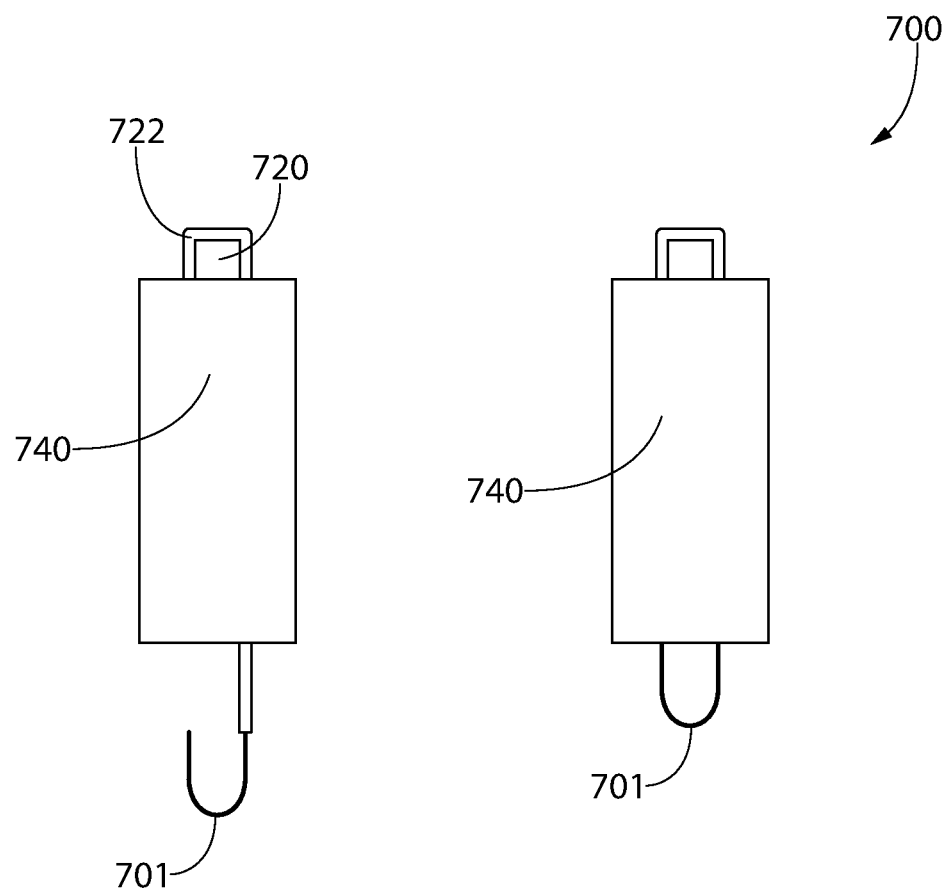
FIG. 7 is a depiction of another example security system for permitting a consumer unrestricted access to an article.

As described, the security system may be affixed to a surface in some examples. In other examples, the security system may not be affixed to a surface in some examples. FIG. 7 shows an example of a security system 700 in which the locking mechanism 701 is not affixed to a surface, such as a hanging surface (e.g., an arm).

Security system 700 may have a housing 740. Housing 740 may be used to house and/or a couple to a locking mechanism (such as locking mechanism 501). Locking mechanism 701 may be used to couple security system 700, for example, to a consumer article, as described herein. As shown on FIG. 7, locking mechanism 701 may be a hook that couples to housing 740 and/or uncouples from housing 740. The consumer article may be secured when the locking mechanism 701 couples to the housing 740 and/or may be unsecured (e.g., released) when the locking mechanism 701 decouples from the housing 740. Housing 740 may include an actuator (such as a motor or the like) for causing the locking mechanism 701 to couple or decouple from housing 740.

Security system 700 may include an attachment, such as attachment 722. Attachment 722 may have an opening, such as aperture 720. Attachment 722 may be used for attaching the locking mechanism 701 to a surface, such as hanging surface (e.g. an arm), via aperture 720. The attachment 722 may be removably attached to the surface. For example, one or more of the arms of attachment 722 may be decoupled from housing 740 to release the locking mechanism 701 from the surface (e.g., arm). In other examples, attachment 722 may be permanently attached to the surface (e.g., arm). In still other examples, the attachment 722 and/or the surface may be configured to transition between a secured state and an unsecured state to secure and/or release security system.

Figure 8:
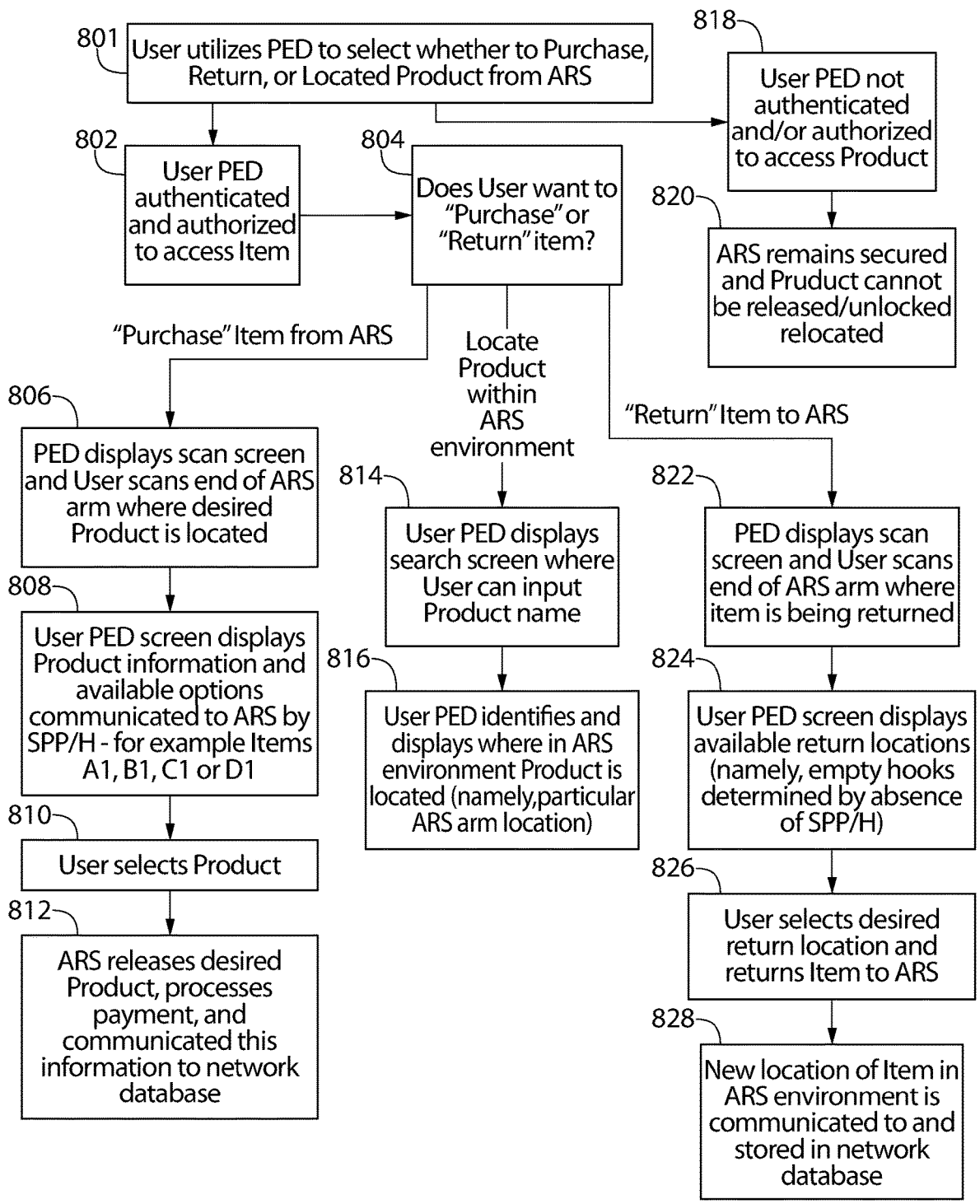
FIG. 8 is a flow chart of a method for providing consumers with an ability to purchase, return, or locate a consumer article.

FIG. 8 illustrates an example process 800 for purchasing (e.g., retrieving) and/or returning an article, such as article 300. FIG. 8 will be described in conjunction with the sample screenshots shown on FIGS. 9A-9I. Although process 800 may be used in conjunction with the locking mechanism (e.g., locking mechanism 501) described herein, process 800 is not limited to such use. For example, the inventory management described in process 800 may be used without or without the use of locking mechanism 501. Further, it should be appreciated that additional steps may be included in the process and/or some of the steps may be excluded or omitted.

In an example, the user may identify an item or product to handle, purchase, and/or return. In conventional systems, the user would be required to find a store employee to assist the user in unlocking the item or product to handle, purchase, or return the item. Using embodiments of the present invention, however, the user may be able to unlock the desired locking mechanism 501 to gain access to the item or product, for example, without assistance from a retail store employee. To do this, the user may be required to download a software application on a portable electronic device, such as portable electronic device 200.

The software application may be retail store specific. The software application may not be retail store specific. The software application may require input from the user to select a retail store, or the software application may determine the specific retail store at which the user is shopping using geolocation information or the like. The software application may have access to consumer financial information such as information about a user's bank accounts, credit cards, PayPal or Venmo accounts, mobile wallets, digital wallets, and/or any other information related to financial accounts of the user that would enable the user to purchase products using those financial accounts.

The user may attempt to access the item. For example, the user may attempt to purchase, locate, and/or return article 300, at 801. The user may attempt to purchase, locate, and/or return article 300 via a portable electronic device. At 802, it may be determined that a user attempting to access the article 300 is authorized or authenticated to access the item. As described herein, in an example a server may review data (e.g., financial data) of the consumer to determine if the user is authorized or authenticated to access the item. The server may review the user's financial accounts to make sure that the user has enough funds to purchase the item and/or the server may process the consumer's request as a pending charge, take a small deposit, etc.

The user will be approved if the user's financial accounts have sufficient funds to purchase the item. An example screen of the portable electronic device authenticating the user is shown on FIG. 9D. In other examples, the authentication could involve a passcode, retinal or fingerprint scan, or other form of unique identification. In such examples, the user will be denied if the user's financial accounts do not have sufficient funds to purchase the item (or if the security system 500 is unable to access the user's financial accounts to make this determination or otherwise authenticate the user). Although the authorization and authentication steps are described substantially in the beginning of process 800, this is for illustration purposes only and is not limiting. The authorization and authentication steps may be performed at any step within process 800 and/or may be performed one or more times throughout the process.

Figure 9C:
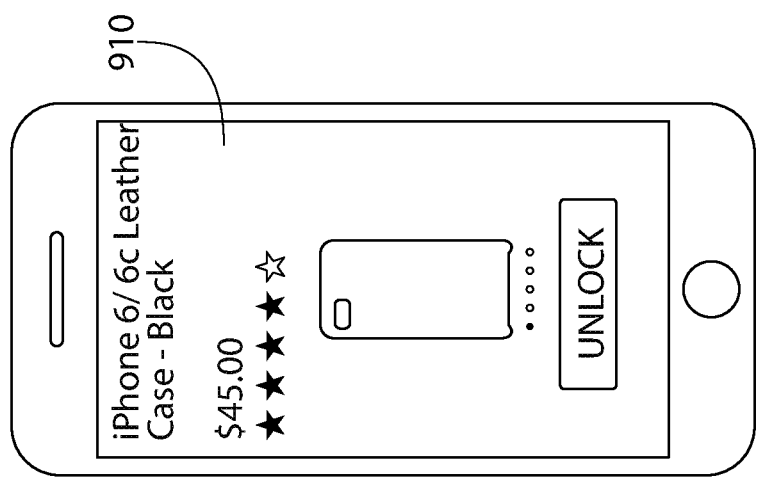
FIGS. 9A-9I are depictions of screen shots of an application displayed on a portable electronic device showing the options available to the user for purchasing, returning, and/or locating an article.
Figure 9B:
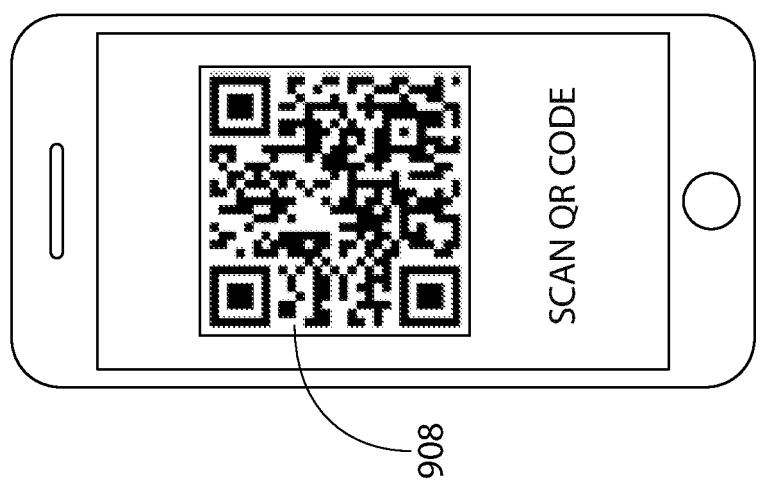
Figure 9A:
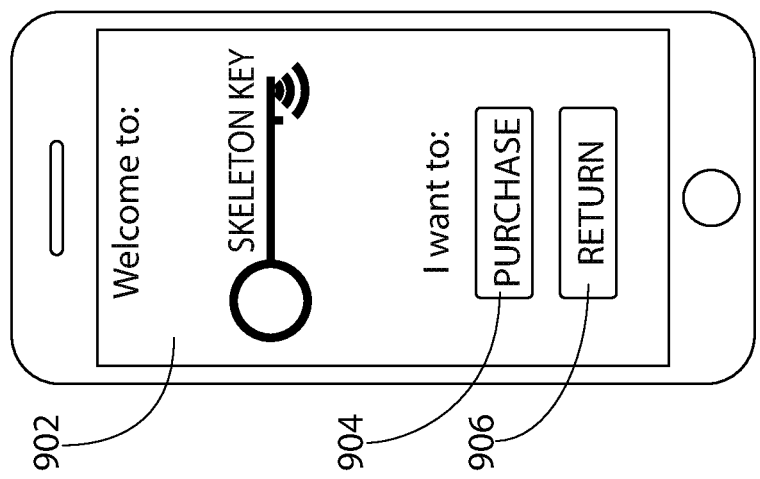

At 804, a user (e.g., a consumer, store employee, or the like) may select whether to purchase, return, or locate a product, such as article 300. In an example, the user may use portable electronic device 200 for the selection. FIG. 9A shows an example screen of the user's portable electronic device in which the user can select whether to purchase an item or return an item.

If the user wants to purchase the item, the process moves to 806. At 806, the user may scan a surface (e.g., arm) holding the locking mechanism securing the item. The user may scan the arm using a portable electronic device. For example, as shown on FIG. 9B, the user may be asked to scan a QR code associated with the product that the user wishes to purchase using the portable electronic device. The QR code may be located directly on the product, on the hanging surface (e.g., arm), and/or on the locking mechanism that is securing the desired product. In other examples, the QR code may be located on one or more other readily identifiable locations.

Security system 500 may include a plurality of the hanging surfaces. The user may scan the QR code on the hanging surface that is supporting the desired item. Once the user scans the QR code (or barcode, etc.) of the item that the user desires to handle and/or purchase, the user's portable electronic device screen may display product information for the product, as shown on FIG. 9C. If the product information being shown on the display is associated with the product that the user wishes to purchase, the user may click on the screen in the designated area (e.g., where the screen displays Unlock) of the portable electronic device.

At 808, the product information may be provided via a display on an application on the portable electronic device. The product may be provided via email, SMS, multimedia messaging service ("MMS"), voice message, instant message, or the like. The portable electronic device may display options available to the user, such one or more of the items on the hanging surface (e.g., arm) and the unique location of each of the one or more items on the hanging surface.

At 810 the user may select a product. The user may select the product via the product's identification (e.g., a unique identification of the product), the location of the product, a combination of the product's identification and the product's location, etc. An example display of selections for the user is provided on FIG. 9E. In the example shown on FIG. 9E, the selections of the items may be based on the locations (e.g., A1, A2, A3, and A4) of the items. The user may select an item at one or more of the locations A1, A2, A3, and A4.

Figure 9F:
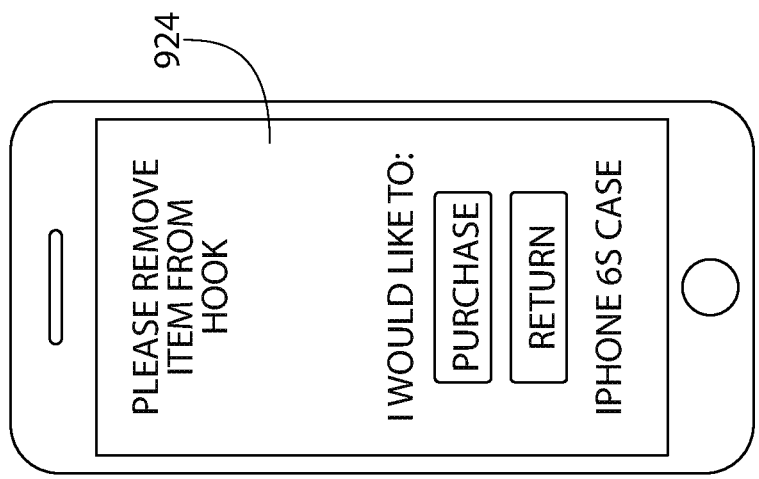
Figure 9E:
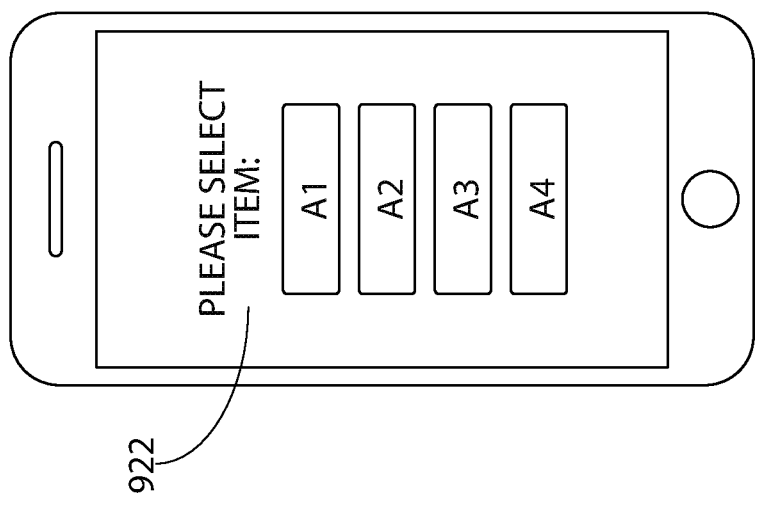
Figure 9D:
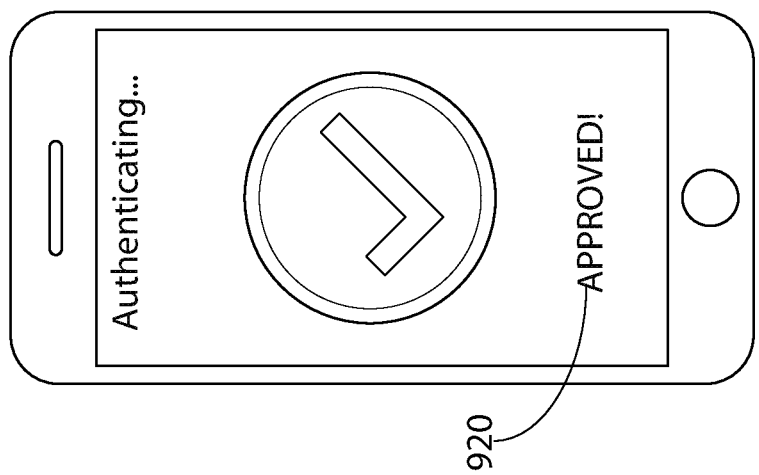

At 812, the selected item may be released (e.g., removed), as described herein. FIG. 9F shows an example in which the user is asked whether the user desires to purchase or return a particular product. The request may be used to ensure that the product requested by the user to purchase or return is the correct product. In examples, the authentication procedure may be performed at this point. In such examples, the selected item may only be released upon a successful authentication of the user.

Upon the release and/or removal of the product, the user may be able to inspect (e.g., handle) the product. The user may be able to inspect the product prior to purchasing the product. For example, although the user's financial accounts may have been reviewed and/or approved (e.g., although the user has been approved or authenticated), the security system may not charge the user the price of the item before the purchase of the product is finalized. In other examples, a pending charge and/or nominal test charge or deposit may be retrieved from the user. The user may be able to handle and/or view the item up close before deciding (e.g., by clicking the designated area) to purchase or return the product.

The anti-theft system 500 may set access limitations to the consumer's access to and/or use of the article 300. The access limitations may include, without limitation, geographical limitations, temporal limitations, partial access limitations, or the like. After the access limitations are set, the consumer may have increased access to and/or may freely move around a predefined location, such as a retail store (or elsewhere) with the article 300. In certain embodiment, a retailer or lessor may provide consumers or leases with more or less restrictive access limitations, for example, based on the perceived threat of the consumer. A supervisor, salesperson, or other staff member may manually increase a consumer's access limitations, for example, based on observed reckless and disrespectful behavior that may damage the product.

The anti-theft system 500 may set geographical limitations on the consumer's access to the article 300. The geographical limitation may be a predefined geographic area within which the consumer is required to remain while having free/unrestricted/partially restricted access to the article 300. The anti-theft system 500 may track the location of the article 300 (and/or of the portable electronic device 200 of the consumer) to ensure that the geographical limitations are being complied with. The anti-theft system 500 may analyze whether the article 300 has exited a predefined geographic area. If the anti-theft system 500 determines that the article 300 has exited a predefined geographic area, the anti-theft system 500 may (but does not necessarily have to) charge the price of the article 300 to a financial account of the consumer. If the anti-theft system 500 determines that the article 300 has not exited the predefined geographic area, the anti-theft system 500 may determine whether the consumer has returned the article 300.

A predefined geographical area within which the consumer must remain while having access to the article 300 may extend beyond the bounds of the retail store, for example. Thus, the consumer can leave the store with the article 300 to test the functionalities of the article 300 outside of the store. Such ability to move may be beneficial, for example, if the article 300 is a camera and the user wants to test its picture quality when taking pictures outdoors, if the article 300 is clothing and the consumer wants to see how the consumer looks in the clothing in natural lighting, if the article 300 is a vehicle (e.g., scooter, car, etc.) that the user wants to test drive or use for travel.

The anti-theft system 500 may monitor and track the location of the article 300 when it is being accessed by a consumer, for example, to ensure that the article 300 does not leave the bounds of the predefined geographic area. For example, the anti-theft system 500 may include an operably coupled electronic article surveillance (EAS) beacon that emits an electromagnetic field that a corresponding security tag that is coupled to the article 300 detects. The electromagnetic field can correspond to the predefined geographical area within which the article 300 is desired to remain. When the security tag coupled to the article 300 leaves the predetermined geographic area, an alarm may sound, or a signal may be transmitted to the anti-theft system 500 ordering the anti-theft system 500 to charge the price of the article to the consumer's accounts, as discussed herein. In such an embodiment, as long as the security tag or transponder is detecting the electromagnetic field of the EAS beacon, the anti-theft system 500 will be informed that the article 300 remains within the predefined geographical area. In other embodiments, the article 300 may have a global positioning system (GPS) affixed thereto that communicates with the anti-theft system 500 to track, continuously or on a set schedule, the location of the article 300 and ensure that it remains within the predefined geographical area. In yet another embodiment, the article 300 may include an RFID tag or other transponder that initiates an alarm or a signal to the anti-theft system 500 if the article 300 passes through a gate positioned at the entrance/exit of the retail store.

As mentioned above, in certain embodiments upon the consumer taking the article 300 to a location that is outside of the predefined geographical area, the anti-theft system 500 may be directed to charge the price of the article 300 to the user's financial accounts using the earlier collected financial account data. If this takes place, a notification may be sent to the consumer's portable electronic device 200 informing the consumer that the price of the article 300 has been charged to the consumer's account. This can be in the form of a receipt for purchase (which will enable the consumer to return the article 300 if, for example, the user accidently left the geographical area but had no intent to steal or purchase the article 300). However, even if the user did not have financial account data that was accessed by the anti-theft system 500, the anti-theft system 500 may have identifying information about the consumer so that proper legal action can be taken against the consumer for the theft.

If the user elects to purchase the product, the security system may charge the price of the article to the user. For example, upon the finalization of the purchase the user is permitted to walk out of the store with the product and the security system will charge the price of the item to the user's financial accounts.

Figure 9I:
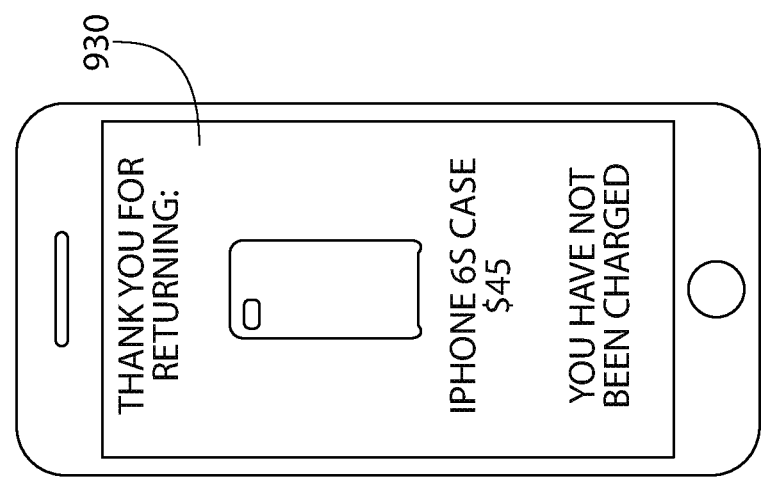

Upon completion of a purchase, a confirmation may be provided to the user. FIG. 9G shows an example confirmation of the purchase. As shown on FIG. 9G, product information (e.g., name, price, quantity) may be provided to the user in the confirmation message to the user. The confirmation may indicate that the item has been purchased and/or that a receipt will be provided to the user, for example, via email, SMS, or the like.

Figure 11A:
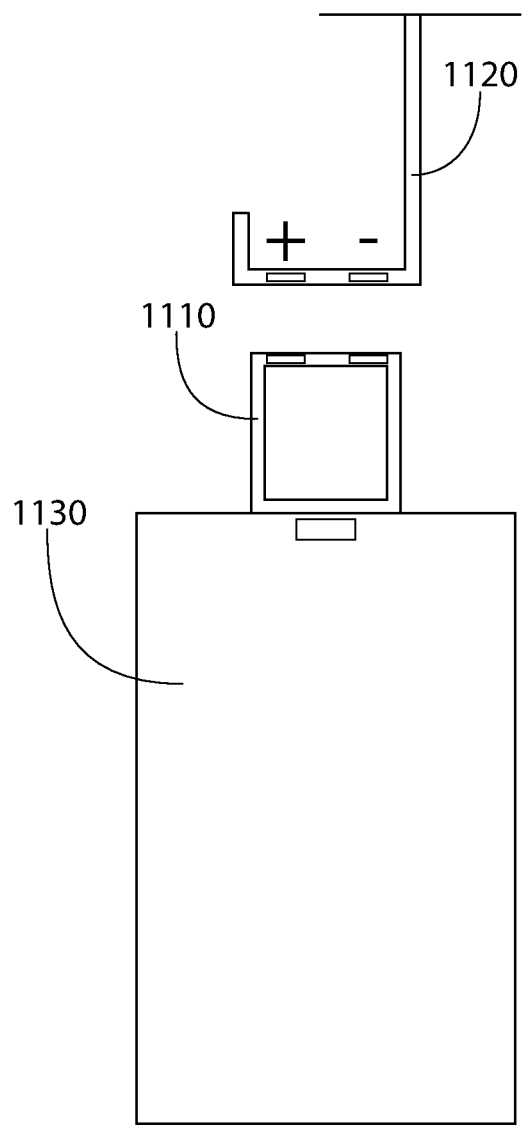
FIGS. 11A-11B are depictions of another example packaging that is used in conjunction with the security system, described herein.
Figure 11B:
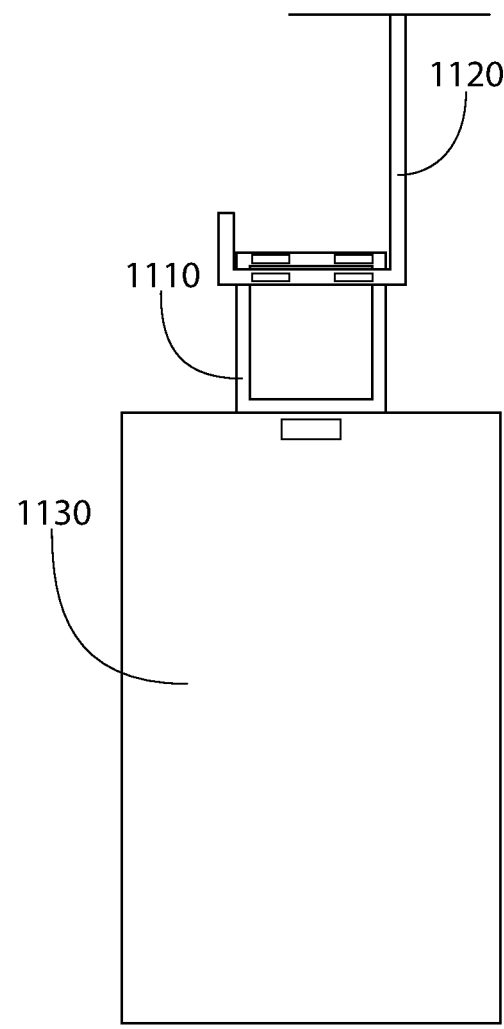
Figure 12C:
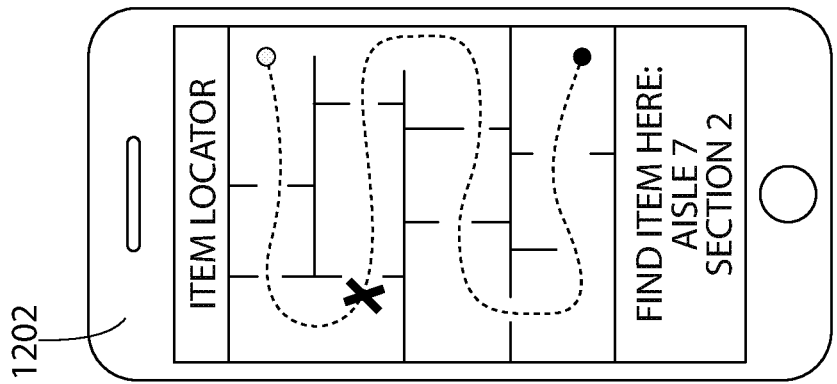
FIGS. 12A-12C are depictions of screen shots of an application displayed on a portable electronic device showing consumer article locate features.
Figure 12B:
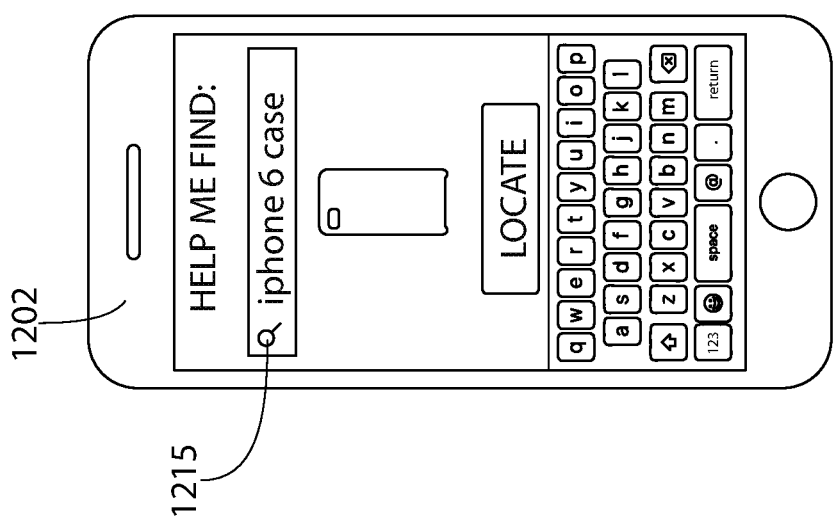
Figure 12A:
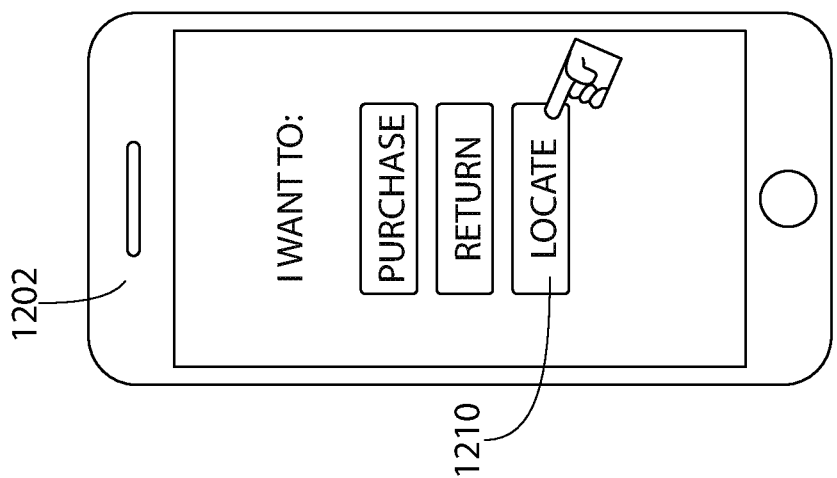

The user may know the location of the item prior to attempting to purchase the item. In such examples, the user may independently maneuver throughout a store to find the item, for example, the item secured by the locking mechanism. In other examples, the user may not know the location of the product prior to attempting to purchase the item. In such examples, the user may use the portable electronic device to determine the location of the item. FIGS. 11A-11C show example screenshots of a user locating a product via portable electronic device.

The user may indicate to portable electronic device that the location of the product is desired (e.g., see screenshot on FIG. 11A). At 814, the portable electronic device may display a search screen providing an input in which the user can input identification information of the product, as shown on the example screenshot on FIG. 11B. The identification information may include the product's name, model number, serial number, category of the product, etc. Upon the user inputting the identification information of the product, the location of the product may be provided, at 816. The location of the product may be an aisle and/or bay in which the product is located, a container in which the product is located, a section in which the product is located, etc. In addition, or alternatively, the location of the product may be the surface (e.g., the arm) that the product is coupled to. As shown on FIG. 11C, the portable electronic device may show a map of the retail store. The map of the store may include directions to the product. The directions may be turn by turn directions and/or the directions may be overlaid upon a map of the store.

In an example, the user may want to return the product (e.g., return the product to the locking mechanism, such locking mechanism 501). In some examples, the product may only be returnable to a locking mechanism that is unoccupied. In such examples, if the user attempts to return a product to an occupied locking mechanism, the user will be denied the ability to return the product. The user may receive an indication of the denial via the portable electronic device and/or the locking mechanism 501 may not be altered from a secured state to an unsecured state. In other examples, more than one product may be returned to a locking unit. In such examples, the product may be returnable to a locking mechanism that is occupied or unoccupied.

Figure 9H:
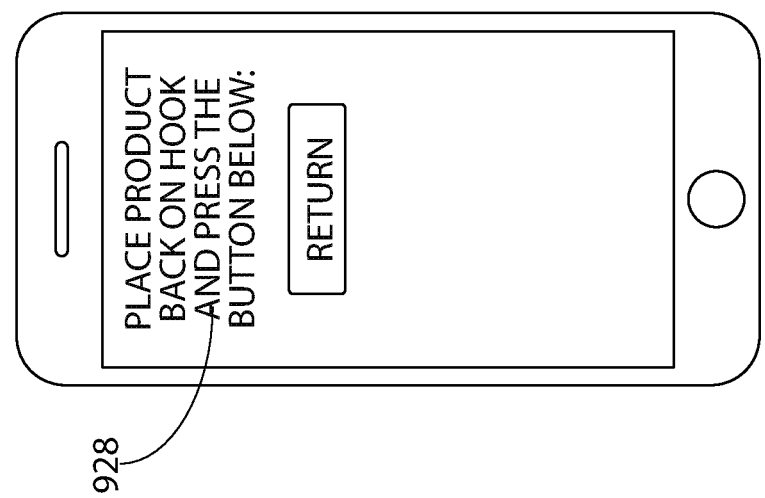
Figure 9G:
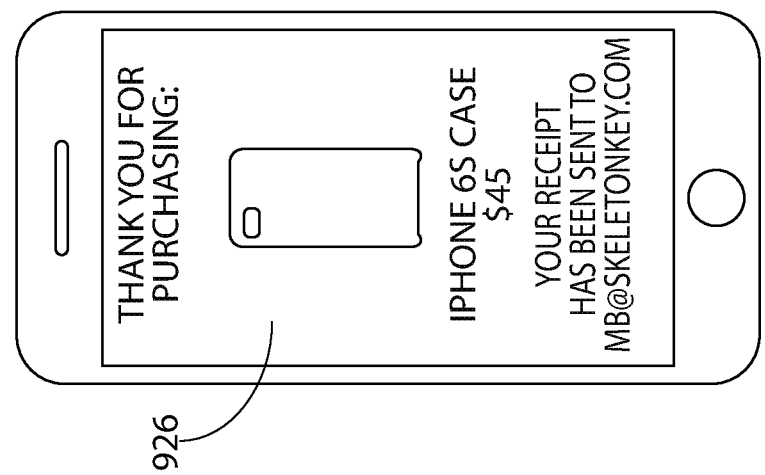

FIG. 9H shows an example screenshot in which the portable electronic device indicates to the user to return the product to the locking mechanism (e.g., the hook). At 822, the portable electronic device may display a screen for scanning a return location for the item. In some examples, the screen for scanning a return location of the item may be similar to the example shown on FIG. 9B, described above.

The return location may be a location defined by the store for the particular item. For example, the store may define a particular location for a particular product. In such an example, the product may only be returned to the location defined by the store. In such examples, at 824 the portable electronic device may provide available locations defined by the store for the return of the product. As shown on FIG. 11B, the user may input an identification of the product (e.g., a name, model number, etc., of the product). The user may input the identification information via a textbox, such as textbox 1115, or the like. Based on the product information, the portable electronic device may provide location information of the article. FIG. 11C shows an example of the portable electronic device providing a location to the product.

Locations of the products may be based on category of the product returned, security devices available to be coupled to items, rank (e.g., sales rank of the product), and the like. For example, the portable electronic device may display end cap locations to the user for products that the store is promoting. In other examples, the return location may be defined by the user. The return location may be a location that is convenient to the user for returning the item. Such locations may include a location that the user is passing on the way out of the store. In other examples, the user may be directed to a designated return section. The return section may be defined by the store as a temporary section where items are placed until the items are returned to the ultimately desired location.

At 826, the user may select the desired location and may return the item to the location. To return the item, the locking mechanism (e.g., locking mechanism 501, such as hook) securing the item that the user desires to return may become (and remain) unsecured. The user may return the product to the locking mechanism, for example, by placing the item back on that locking mechanism (e.g., hook). Once the item is back on the locking mechanism, security system may re-secure the product, for example, by coupling the locking mechanism to a hanging surface (as described herein). In examples, another activity may be required in order for the item to be re-secured by the locking mechanism. For example, to ensure that a correct article is returned an image may be taken of the returned article, weight measurements may be taken of the article, the article may be scanned, a RFID reader may perform a scan of the returned article, etc. The security system may be updated with the information of the returned article, such as the location (e.g., new location) of the returned article.

The above steps of 800 assume that the consumer was authenticated and/or approved for handling article 300. In some examples, the consumer will not be authenticated and/or authorized to access the item, as shown on 818. If the consumer is not authenticated and/or authorized to access the item, the locking mechanism may remain secured (e.g., the locking mechanism is coupled such that the item is not releasable to the consumer), at 820. In examples in which the consumer is not authenticated and/or authorized to access the item the locking mechanism may transmit a signal to a sales representative indicating to the sales representative that a consumer attempted to gain access to the article 300 and was not authenticated and/or authorized to access the item. The signal can be transmitted to a portable electronic device being carried by the sales representative or otherwise such as by being displayed on a display in the retail store, or by being transmitted through an audio system of the retail store, or by blinking a light or lights located at a particular location within the retail store.

As described herein, although the anti-theft system 500 may attempt to compile and analyze financial account data of the consumer, the anti-theft system 500 may not charge the price of the article 300 to the accounts of the user, for example, until the user completes a purchase of the article 300. Thus, the anti-theft system 500 provides a consumer with unrestricted access to the article 300 without charging the price of the article to the consumer's financial account(s). The review of the consumer's financial accounts is done for risk assessment purposes and enables the anti-theft system 500 to charge the consumer's account(s) in the event that the consumer does in fact attempt to or steal the article 300 or successfully steal the article 300.

Upon the article 300 being re-secured by the anti-theft system 500, a notification may be transmitted to the portable electronic device 200 and/or to the server 503 indicating that the article 300 was returned. This may include providing a receipt or other proof that the consumer can use to prove that the article 300 was returned in accordance with the access limitations to release the consumer from any financial obligations associated with the article 300.

As described herein, the user may perform an action that proves the item was returned to the location. For example, the user may take a photograph of the product and the location, the user may scan an identification of the product and/or the location (e.g., a barcode, QR code, etc., of the product and/or the location, etc.) At 828, the location (e.g., new location) of the item is updated. FIG. 9I shows a screenshot of a confirmation that the product has been returned. The location of the item may be updated in a database, such as a database on a server (e.g., a cloud server).

Upon the purchase and/or return of the item, the security system may update an inventory management system, such as inventory management system 620 (FIG. 4). For example, when the product is purchased via the embodiments described herein, the security system may indicate to the inventory management system that the number of such products should be reduced by the number that was purchased. When the product is returned via the embodiments described herein, the security system may indicate to the inventory management system that the number of such products should be increased by the number that was returned. The security system (e.g., the locking mechanism in use with the security system) can be used to ensure that inventory of the products remains accurate. The purchase and/or return of the products may be verified by one or more (or, a combination of) processes, such as redundancy processes. The purchase and/or return of the products may be verified by one or more of weight/resistance, details provided to the security system (such as whether a seal has been broken), RFID, scan/QR code, video recognition, NFC, etc.

Figure 10A:
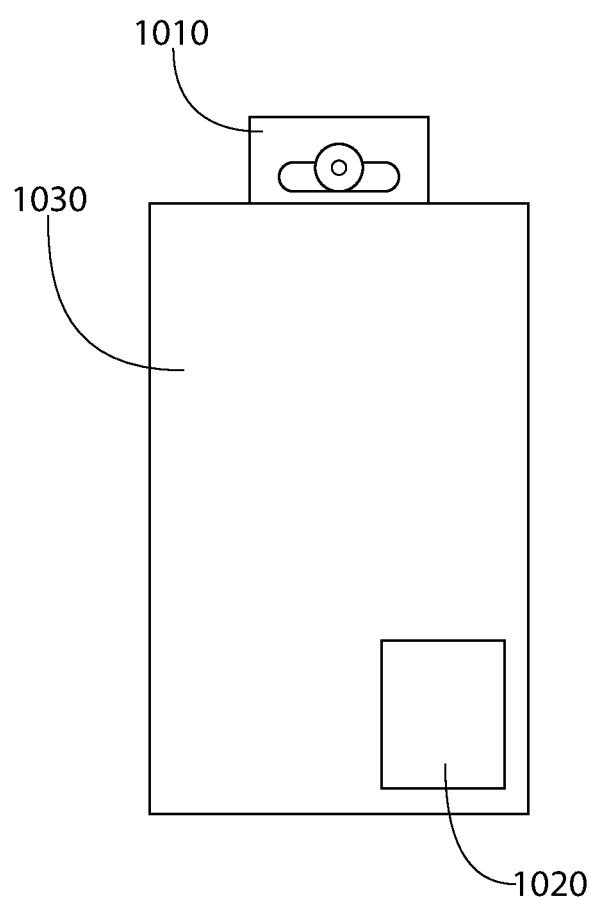
FIGS. 10A-10C are depictions of an example packaging that is used in conjunction with the security system, described herein.
Figure 10B:
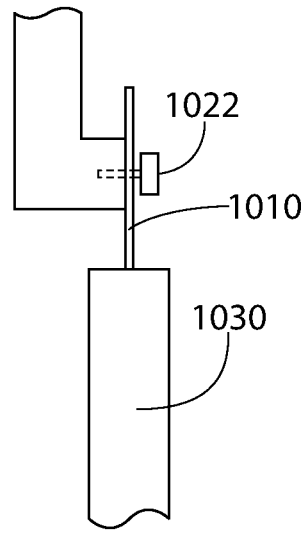
Figure 10C:
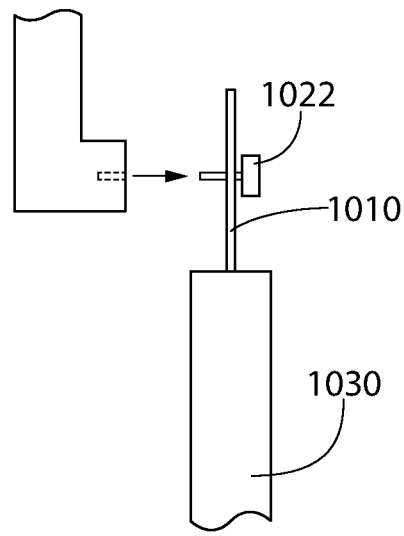

As shown on FIGS. 10A-10C, packaging 1030 may house and/or otherwise couple to consumer article, such as consumer article 1030 (e.g., packaged article 1030). The packaging may be a smart packaging. For example, the packaging may include a readable device, such as the readable device 1020 shown on FIGS. 10A-10C. The readable device may be integrally formed upon the packaging. The readable device may be and/or may include a microchip or another device which may be capable of transmitting/receiving information with security system. Readable device may be configured to communicate with security system via physical contact with the security system (e.g., circuitry) or wirelessly (e.g., an RFID chip).

As described herein, the packaging may be retrofitted into and compatible with existing locking mechanism, such as peg hook packaging. Packaging may include a chip that is implanted in tape or a Snap-On device that retrofits over a peg hook packaging that may be received by a locking mechanism (e.g., a hook). FIG. 10A shows an example in which readable device 1020 is implanted upon the packaging that retrofits over a peg hook.

As further shown on FIGS. 10B-10C, packaging 1010 may be configured to couple to a removable device 1022 for securing and/or releasing the packaging. The removable device 1022 may include a readable device (such as readable device 1020), although it is not required that removable device 1022 include a readable device. As shown on FIG. 10B, the removable device 1022 may be coupled to a surface (e.g., an arm) to secure a consumer article. The removable device 1022 may be uncoupled from the surface to release the consumer article, as shown on FIG. 10C.

The packaging may be permanently coupled to the removable device, for example, via an adhesive or the like. In such examples, the packaging may be removed when the removable device is decoupled from the hanging surface. In other examples, the packaging and the removable device are not permanently coupled.

The smart packaging (e.g., the readable device, etc.) may be capable of transmitting/sending information, such as make, model, manufacturer, price, weight, store location, purchase restrictions (e.g., age restrictions), etc., of the product to the security system. The packaging may be capable of transmitting/sending information, such as whether the product has been stolen, or otherwise compromised, to the security system. The packaging may be capable of transmitting/sending information, such as details concerning supply levels, life of inventory or assets, etc., to the security system. The packaging may be capable of transmitting/sending information, such as details related to consumer decisions and choices related to the product, for example, to assist with loyalty programs, coupons, marketing, ads, etc. The packaging may be disposable, reusable, and/or a combination disposable and reusable.

FIGS. 11A, 11B show other examples of a packaging to be used with the security system. As shown on FIG. 11A, packaging 1110 may house and/or otherwise couple to consumer article 1130. In other examples, packaging 1110 may be integrally formed with consumer article 1130.

Packaging 1110 may allow the consumer article to be secured to and/or released from a surface. For example, packaging 1110 may allow consumer article 1130 to be secured to and/or released from a hanging surface, such as hanging surface 1120 (e.g., a hook). Packaging may be secured to the surface via a magnet, as shown in FIG. 11B. The magnetic force may prevent the consumer article to be removed from the hanging surface 1120, for example, without tearing the packaging 1110. In other examples, the packaging may be of such strength that it will be difficult to tear the packaging.

As shown on FIG. 11A, consumer article 1130 may be released from hanging surface 1120. For example, a magnetic force coupling packaging 1110 with hanging surface 1120 may be removed, thereby releasing the packaging (and the consumer article) from the hanging surface 1120. The magnetic force may secure the packaging to the hanging surface and/or release the packaging from the hanging surface based on signals received from the portable electronic device, for example.

As described herein, the security system may include an inventory management system. For example, server 502 of security system 500 may include inventory management system 602, as shown on FIG. 4. In other examples, inventory management system may be separate and/or independent from security system 500. Inventory management system may facilitate operation of a smart product return system. For example, inventory management system may enable consumers to bypass human operated customer service stations when returning products and/or when receiving refunds (e.g., on the returned products). In examples, a return scanning station, receptacle, bin, or the like, may be provided that communicates with the inventory management system to identify the product, confirm that the packaging has not been compromised, and that the product is still in the package being returned. Based on one or more factors being satisfied, the inventory management system may allow the consumer to return the product and/or to receive a refund.

Inventory management system may store, update, and the like, inventory information of products sold by the store. For example, the inventory management system may include identification information (e.g., name, color, model number, etc.) of the products sold by the store. The inventory management system may include other information of the products, including the number of products located in the store, the location of the products in the store, the rate of sale of the products, and the time (e.g., average time) to receive additional products (e.g., time required for replenishment of the products).

The purchase and return of products via security system 500 is described herein. For example, in an example return of the product, the user may scan the product. The inventory management system may provide a location for the return of the product, or the inventory management system may allow the user to return the product to any location that can accept the product (e.g., any location that includes a locking mechanism for securing the product). Upon the user finding the desired and/or permitted location, the user may scan the location, as described herein. For example, the user may scan a QR code of a surface and/or an optical machine-readable representation of data associated with the return system, etc. The user may place the product in the location. For example, the user may place the product in a locking mechanism in the location. The inventory management system may be updated to indicate that the specified product has been returned to the specified location upon return of the product. For example, the inventory management system may be updated to indicate that the product having a certain name, number, color, weight, price, etc., has been returned. The inventory management system may be updated to indicate the location (e.g., aisle, bin, etc.) that the product was returned to, the name of the person who returned the product, what time and/or date the product was returned, the price that was refunded to the consumer, etc.

The purchase of products may interface with the inventory management system in a manner that is similar to the return of the products. In an example purchase of the product, the user may scan the product and/or the location of the product. For example, the user may scan a QR code of the location of the product. The user may remove the product from the location and may purchase the product. The inventory management system may be updated to indicate that the specified product has been purchased from the specified location. For example, the inventory management system may be updated to indicate that the product having a certain name, number, color, weight, price, etc., has been purchased. The inventory management system may be updated to indicate the location (e.g., aisle, bin, etc.) that the product was purchased from, the name of the person who purchased the product, what time and/or date the product was purchased, the price in which the product was sold to the consumer, etc.

Purchasing and/or returning products via the security system provides many benefits. The benefits of the security system and/or the smart product packaging (as described herein) may include, without limitation, that products can be returned anywhere (e.g., not just to the product's original location). Further, the inventory management will be updated with accurate inventory information, which may result in products being easily located by consumers and store employees. The inventory management system may provide the ability of identifying consumer choices and preferences. Products with restrictions (e.g., nicotine products and alcohol) may be identified and require heightened level of authorization. For example, verification of age may be made via valid identification, or the like.

As described herein, the inventory management system may store, transmit, and/or receive information of the products, including the number of products located in the store, the location of the products in the store, the rate of sale of the products, and/or the time (e.g., average time) to receive additional products (e.g., time required for replenishment of the products). The inventory management system may update the number of products located in the store upon the products being purchased and/or returned. Based on the number of products left in the store, as well as the rate of sale of the products and the time required for replenishment of the products (e.g., due to shipping time, etc.), the inventory management system may order more products or refrain from ordering more products.

As an example, the store may have one hundred items of a particular product. If the rate of sale of the product is two per day, it is estimated that the product will be sold out in fifty days. In such an example, the product must be ordered no later than fifty days from the date the calculation has been performed. Other factors may be considered for ordering products, such as the time it takes for replenishment of the products, for example, due to shipping delays, etc. The additional factors may be considered in the ordering of the products. For example, using the above example, if the product is estimated to sell out in fifty days, and the time required for replenishment is five days, the order for the additional products must be placed no later than forty-five days from the date of the calculation to ensure that the retail store does not sell out of the products. The inventory management system may provide an indication (e.g., an indication to a store employee) that the products must be ordered by the defined date, in some examples. In other examples, the inventory management system may automatically order (e.g., may automatically place on order via the Internet) of the desired products by the defined date.

Embodiments of the present invention further include a digital authorization (e.g., digital key). The digital authorization may be used to purchase, return, etc., a product. In examples, the digital authorization may be used to secure and/or release a product via security system (e.g., via locking mechanism 501, described herein). The use of the digital authorization, however, is not so limiting and may be used with or without security system 500.

Figure 13A:
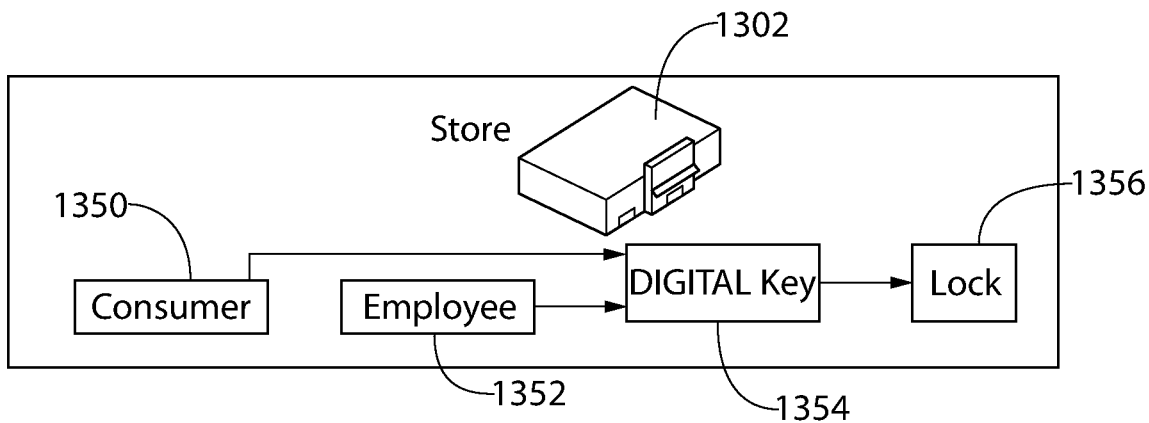
FIGS. 13A-13E are depictions of example systems providing a digital authentication of a consumer for permitting a consumer unrestricted access to an article.
Figure 13B:
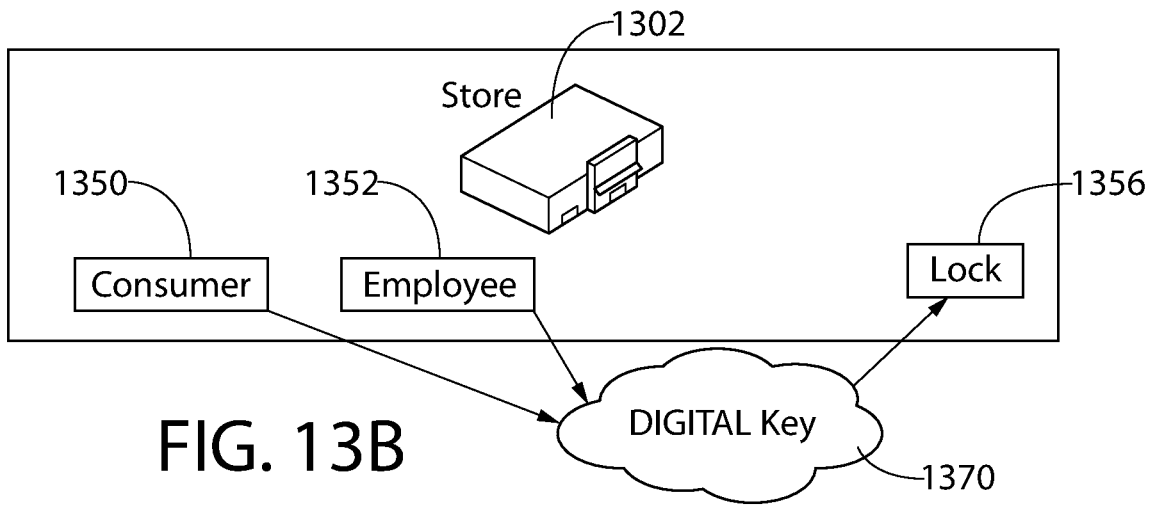
Figure 13C:
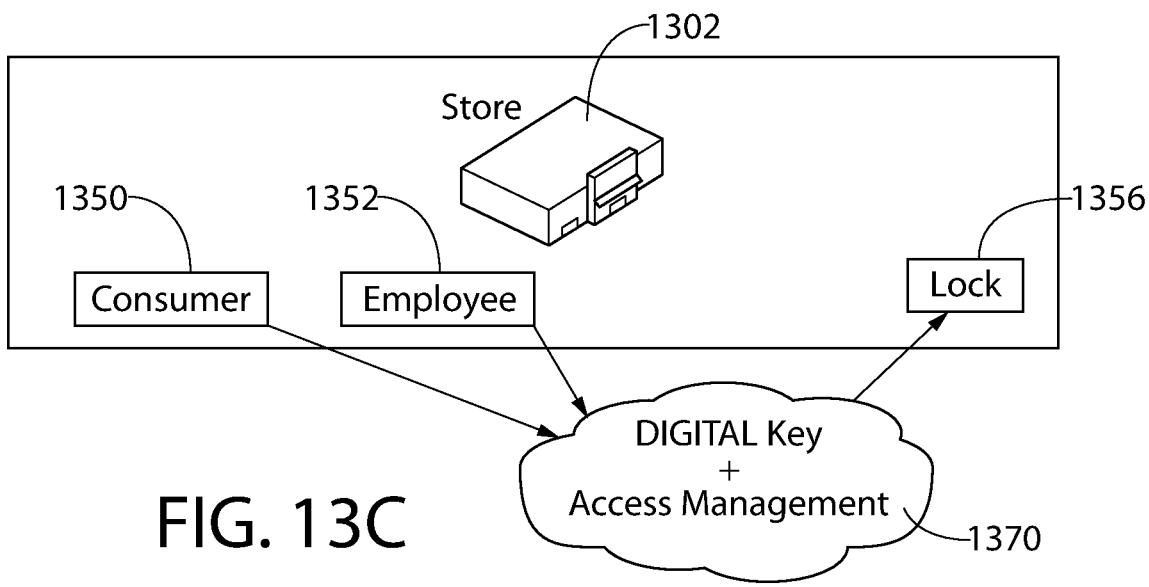
Figure 13D:
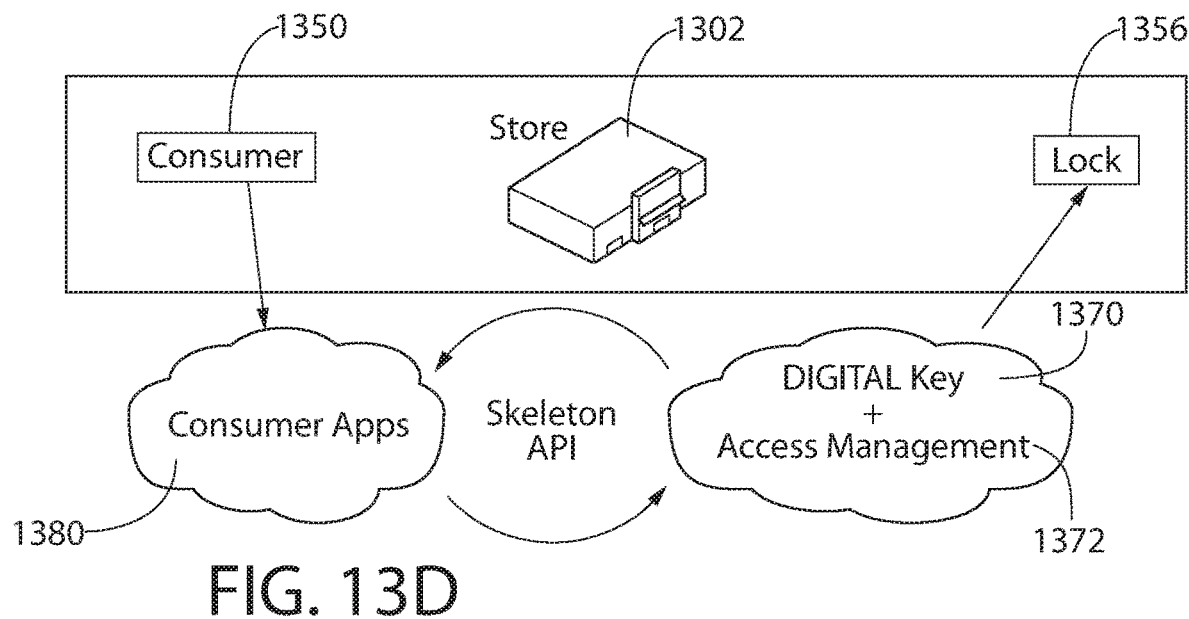

FIG. 13A shows an example use of the digital authorization. As described herein, articles (e.g., packaged articles) may be housed in a store, such as store 1302, and may be secured via a security system 500. For example, articles may be coupled to a locking mechanism, such as locking mechanism 501. The articles may be coupled to the locking mechanism such that the articles may be released upon an authorization.

For example, consumer 1350 may desire to purchase an article. In conventional systems, consumer 1350 would be required to find a store associate (e.g., Employee 1352) to physically unlock the secured article. As described herein, this can be frustrating to the consumer for many reasons. It is therefore desired to secure an article using a security system (e.g., a locking mechanism of the security system) in a secured state, and to allow for a remote method of releasing the article from the secured state. There may also be a desire to secure an article (e.g., upon a return of the article) via a remote method. The disclosure describes many ways in which a consumer may secure and/or release a product via security system.

As an example, a product may be secured to and/or released from a locking mechanism based on the locking mechanism having access (e.g., direct access) to the consumer's financial information. It may be desired that the product be secured and/or released from the locking mechanism using a remote method that indirectly accesses the consumer's financial information. Such a method may include a digital key, as described herein. A benefit of the digital key may be that the key may be associated with the security system (e.g., the locking mechanism), the consumer, the article, the store in which the article is purchased and/or returned, etc.

Referring to FIG. 13A, a digital authorization may be generated. The digital authorization may be a digital key, such as digital key 1354. The digital key 1354 may be generated by a server, such as server 502 (FIG. 4). The digital key may be generated by a portable electronic device. The digital key 1354 may be unique. For example, the digital key 1354 may include one or more alphanumeric numbers, letters, binary numbers, hexadecimal numbers, etc., or a combination thereof.

Upon the generation of digital key 1354, the digital key 1354 may be associated with a security system and/or an article (e.g., article 300) coupled to the security system. For example, digital key 1354 may be associated with a locking mechanism, such as locking mechanism 501. The digital key may be associated with an RFID tag, for example, attached to the locking mechanism and/or the article. The digital key may be associated with an identifier of the article, such as a serial number of the article or the like. The digital key 1354 may be associated with a user. For example, the digital key 1354 may be assigned to a user. The digital key 1354 may be assigned to a user and may be usable by the user (e.g., consumer, employee, etc.) for one or more transactions. The digital key 1354 may be associated with a locking mechanism and/or the article for a one-time only transaction. For example, the digital key may be associated with the locking mechanism and/or the article for a single opening or closing of the locking mechanism, for example, upon the purchase or return of the article coupled to the locking mechanism.

In other examples, the digital key 1354 may be associated with the locking mechanism and/or the article for more than one transaction. For example, the digital key 1354 may remain associated with the locking mechanism and/or the article beyond the one-time purchase. In such an example, the consumer may retain the locking mechanism after purchase of the article, and the digital key 1354 may remain associated with the locking mechanism retained by the consumer. The digital key 1354 may have access to information related to the locking mechanism (e.g., location information of the locking mechanism) and/or the article (e.g., location of the article, identification information of the article, etc.).

The digital key 1354 may remain associated with the locking mechanism and/or the article within a single store. In other examples, the digital key 1354 may remain associated with the locking mechanism and/or the article in more than one store. In an example, the user may purchase the article and retain the locking mechanism upon purchase. Digital key 1354 may be associated with the locking mechanism and/or the article, even after the consumer takes the locking mechanism out of the store. In such an example, if the user later desires to return the article, the digital key 1354 remains associated with the locking mechanism and/or the article. The consumer can return the article (using the process described herein) using the digital key (e.g., the same digital key, and process) that was used for purchasing the article.

The digital key 1354 may remain associated with the locking mechanism if the consumer returns the article to the same store, in examples. In other examples, the digital key 1354 remains associated with the locking mechanism in one more stores, including stores in which the consumer did not purchase the article. The digital key may be stored on a server in order to remain associated with the locking mechanism. In other examples the digital key 1354 may be stored on a portable electronic device of a user in order to remain associated with the locking mechanism.

One or more users (e.g., consumer 1350, employee 1352, etc.) may use the digital key 1354 to release a lock, such as lock 1356 (e.g., locking mechanism 501) from an article or secure the lock 1356 to the article, as described herein. The digital key 1354 may be assigned to one or more users for one or more transactions. The digital key 1354 may be local to a particular store, as shown in FIG. 13 and described herein. As shown on FIG. 13B, the digital key 1354 may be stored on a server (e.g., server 1370 (FIG. 13B), which may be a cloud server). In examples where the digital key 1354 is stored on a server, the digital key 1354 may be used in one or more locations, stores, etc.

Upon use of the digital key 1354, the digital key 1354 may be exhausted (e.g., unassigned from the consumer, returned to the server, destroyed, unusable, etc.). The digital key 1354 may be exhausted upon an event (such as a purchase of an article or a return of an article), a series of events, or the like. The digital key 1354 may be exhausted upon a predetermined number of uses, including one, two, twenty, etc., uses. The digital key 1354 may be exhausted after a predetermined amount of time. For example, the digital key 1354 may be exhausted beyond a predetermined return period for the article, such as thirty days after use. In other examples, the digital key 1354 may not be exhausted.

The digital key 1354 may be a generic digital key that is generated prior to the consumer accessing a particular store. For example, the consumer may generate a generic digital key at home via a registration procedure. The digital key 1354 may be used at one or more (e.g., any or all stores). The digital key 1354 may be used for one or more articles (e.g., any or all articles). The digital key 1354 may be used at one or more locations that participate in a digital key program and/or that associate with applications that participate in a digital key program. In other examples, a digital key 1354 may be generated for one or more designated stores and/or uses. For example, a different digital key may be generated for car stores, clothing stores, electronic stores, services, etc.

The digital key 1354 may be associated with one or more people. As shown on FIG. 13C, the digital key 1354 may be managed, for example, via Access Management 1372. Access Management 1372 may define privileges of a consumer based on the role, assessment, authorization, etc., of a user. Access management 1372 may enforce the user's privileges via the digital key. For example, the digital key 1354 may be associated with a purchaser, an employee, etc., an administrator of the security system, etc. The digital key 1354 may provide different privileges (e.g., such as the ability to release a lock, secure a lock, etc.), based on the role of the user. The digital key may associate the digital key 1354 and/or define privileges to a user based on a sub-role, such as an associate employee, a manager employee, etc., of a particular store.

As described herein, the digital key 1354 may provide predefined privileges to one or more users based on the user's role and/or sub-role. For example, digital key 1354 may provide an administrator may with the privilege to secure and release locking mechanisms within one or more (including all) departments of a store, and/or digital key 1354 may provide a store associate within a department the privilege to secure and release locking mechanism within the associate's department. The digital key 1354 may provide a privilege to secure and release locking mechanisms within more than one department to a manager of the store, etc.

The digital key 1354 may provide a privilege to secure and release a locking mechanism associated with a consumer upon the consumer being authenticated to release and/or secure the locking mechanism, as described herein. Access may be given to users based on a date, time, and the like. For example, an employee may only be given privileges to unlock a locking mechanism during the employee's working hours. The consumer may only be given privileges to unlock a locking mechanism during the store's hours. In other examples, the digital key 1354 may provide the user with unlimited privileges to unlock and/or lock the locking mechanism.

The digital key may be provided to one or more users in which the digital key is associated. For example, the digital key may be provided to a user to be stored on a user's portable electronic device. The digital key may be transferable from one user to another user. For example, in examples in which the digital key is provided to the user, the user may transfer the digital key to another user. In other examples, the digital key may be kept confidential. In such examples the digital key may not be stored on the user's portable electronic device and/or may not be transferable.

The digital key may be accessible to a user (e.g., a consumer) via one or more applications. For example, as shown on FIG. 13D, digital key 1354 may be accessible to a consumer via an application (e.g., consumer application 1380) that is accessible to the consumer 1350. The consumer application may have access to the digital key 1370 and/or to Access Management 1372. Consumer application 1350 may have access to the consumer's financial account information, as described herein. Consumer application 1350 may perform an authorization of the user and provide the results of the authorization to the assess management 1372. In other examples, the consumer application 1350 may provide information associated with the consumer 1350 (e.g., financial information of the consumer 1350) to the assessment management 1372 for an authorization of the consumer 1350. Although an employee of the store is not shown on FIG. 13D, n employee may be used to provide access or other assistance to the consumer.

Figure 13E:
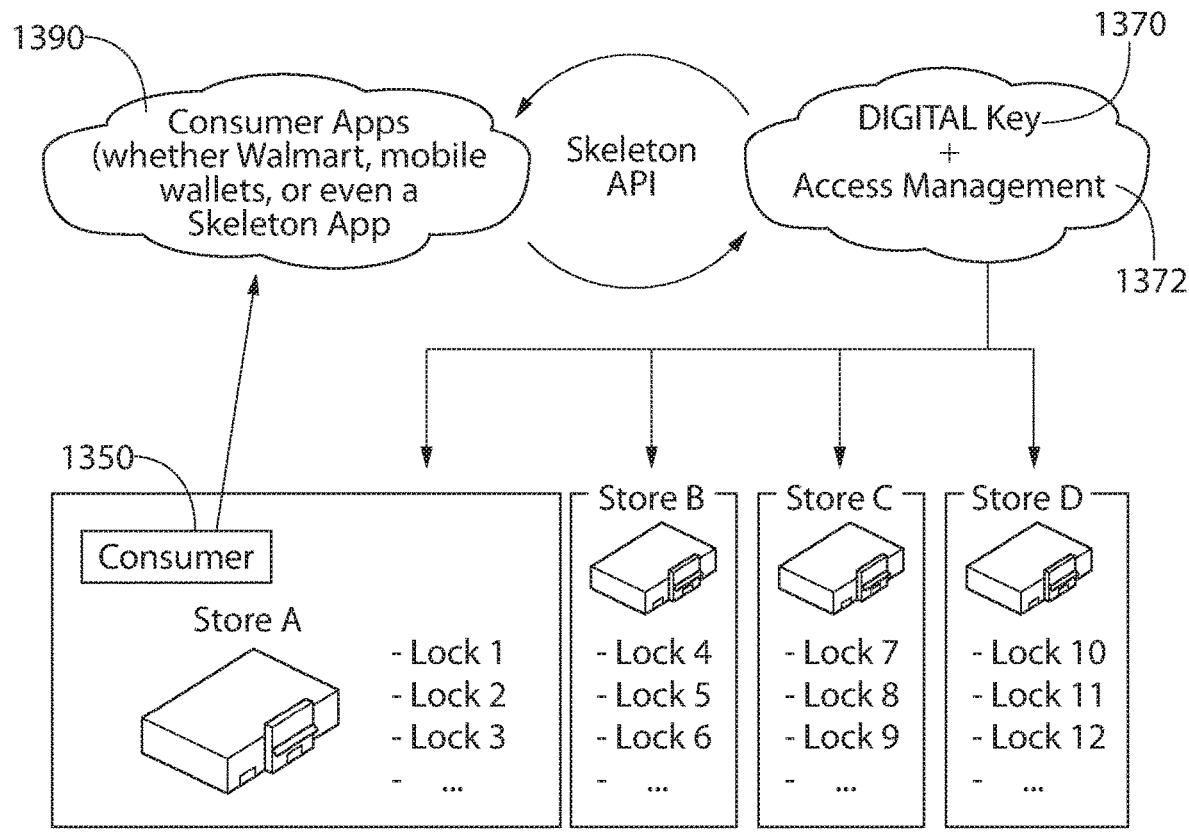

FIG. 13E shows an example in which consumer 1350 may secure and/or release a plurality of locking mechanisms within a plurality of stores. As described herein, the digital key 1354 may be stored on a portable electronic device of the consumer and/or a server, thereby being accessible to one or more stores. The digital key 1354 may be accessible to the user via one or more applications, such as applications relating to a particular store in which the locking mechanism is located. In examples, the applications may be generic to any store and/or may be used to secure and/or release locking mechanisms in one or more stores.

As shown on FIG. 13E, consumer 1350 may be permitted to secure and/or release locking mechanisms 1-3 at Store A, locking mechanisms 4-6 at Store B, locking mechanisms 7-9 at Store C, and/or locking mechanisms 10-12 at Store D. As described herein, an authorization may be required for the consumer to secure and/or release one or more of the locking mechanisms. The consumer may be permitted to secure and/or release one or more of the locking mechanisms based on user information (e.g., user financial account information; user member accounts; user behaviors, such as previous purchases or returns, etc.). The consumer may be permitted to secure and/or release one or more of the locking mechanisms based on the stores business rules. For example, retail stores may only permit the digital key to be used during peak hours, non-peak hours, weekdays, weekends, and the like. Further, different stores may have different rules for allowing consumers to secure and/or release locking mechanisms. For example, high end stores may require that the user have a higher credit score and/or more sums of money in a bank account than a lower end store, for example, to secure and/or release a product via the security system.

Although the invention may be described in terms of steps, in some embodiments certain different steps are performed simultaneously by the system although described herein as being different steps. Furthermore, in some embodiments the steps may take place in a sequence different than that described herein below. Thus, various combinations of some or all of the steps identified below may be used in certain embodiments.

As described above, systems and methods consistent with the invention provide a way for retail stores to prevent theft, while still permitting consumers to have increased access to the store's merchandise. The functionality of the illustrated components may overlap, however, and may be present in fewer or greater number of elements and components. Further, all or part of the functionality of the illustrated elements may co-exist or be distributed among several geographically dispersed locations. For example, each "database" may be embodied as a software component, a hardware component, or a combination of a software component and a hardware component. Moreover, embodiments, features, aspects and principles of the present invention may be implemented in various environments and are not limited to the illustrated environments.

Further, the sequences of events described herein are exemplary and not intended to be limiting. Thus, other process stages may be used, and even with the processes described herein, the particular order of events may vary without departing from the scope of the present invention. Moreover, certain process stages may not be present and additional stages may be implemented. Also, the processes described herein are not inherently related to any particular system or apparatus and may be implemented by any suitable combination of components.

While the invention has been described with respect to specific examples including presently preferred modes of carrying out the invention, those skilled in the art will appreciate that there are numerous variations and permutations of the above described systems and techniques. It is to be understood that other embodiments may be utilized, and structural and functional modifications may be made without departing from the scope of the present invention. Thus, the spirit and scope of the invention should be construed broadly as set forth in the appended claims.

What is claimed is:

1. A system for digitally providing access to an article comprising:
   a locking unit configured to secure the article in a locked state, the locking unit being alterable between the locked state and an unlocked state; and
   a server comprising a processor configured to:
      generate a digital key associated with the article or the locking unit, the digital key being configured such that, when the digital key is provided to a portable electronic device of a user, the digital key enables the portable electronic device to alter the locking unit between the locked state and the unlocked state without the user paying for the article or authorizing payment for the article;
      upon a first event, assign the digital key to the user and cause the assigned digital key to be provided to the portable electronic device of the user to enable the portable electronic device to alter the locking unit between the locked state and the unlocked state;
      wherein the first event comprises:
         the user initiating a request for access to the article or the digital key;
         authentication of the identity of the user initiating the request for access; and
         verification that the user satisfies a predetermined condition; and
      wherein the first event does not comprise a payment for the article or an authorization of payment for the article;
      un-assign the digital key from the user based on a second event such that the digital key is no longer usable by the user for causing the locking unit to alter between the locked state and the unlocked state, wherein the first event and the second event are different events.

2. The system of claim 1 wherein the digital key is associated with a serial number of the article.

3. The system of claim 1 wherein the digital key is transferable amongst a plurality of stores.

4. The system of claim 1:
   wherein the digital key is further configured to cause the locking unit to alter between the locked state and the unlocked stated based on a role of the user;
   wherein the role of the user is (a) a user authorized to purchase the article or a user authorized to return the article; or (b) an employee of a store.

5. The system of claim 4 wherein the digital key is further configured to cause the locking unit to alter between the locked state and the unlocked stated based on a sub-role of the user, the sub-role comprising at least one of an associate of the store, a manager of the store, or an owner of the store.

6. The system of claim 1 wherein the first event comprises an initiation of a purchase of the article and the second event comprises at least one of a purchase of the article or a return of an article.

7. A method for digitally providing access to an article, the method comprising:
   securing, by a locking unit, the article in a locked state, the locking unit being alterable between the locked state and an unlocked state;
   generating a digital key associated with the article or the locking unit, the digital key being configured such that, when the digital key is provided to a portable electronic device of a user, the digital key enables the portable electronic device to alter the locking unit between the locked state and the unlocked state without the user paying for the article or authorizing payment for the article;
   upon a first event, assigning the digital key to the user and causing the assigned digital key to be provided to the portable electronic device of the user to enable the portable electronic device to alter the locking unit between the locked state and the unlocked state;
      wherein the first event comprises:
         the user initiating a request for access to the article or the digital key;
         authentication of the identity of the user initiating the request for access; and
         verification that the user satisfies a predetermined condition; and
      wherein the first event does not comprise a payment for the article or an authorization of payment for the article;
   providing the assigned digital key to a portable electronic device of the user to enable the user's portable electronic device to cause the locking unit to alter between the locked state and the unlocked state; and
   un-assigning the digital key from the user based on a second event such that the digital key is no longer usable by the user for causing the locking unit to alter between the locked state and the unlocked state, wherein the first event and the second event are different events.

8. The method of claim 7 wherein the digital key is associated with a serial number of the article.

9. The method of claim 7 wherein the digital key is transferable amongst a plurality of stores.

10. The method of claim 7:
    wherein the digital key is further configured to cause the locking unit to alter between the locked state and the unlocked stated based on a role of the user;
    wherein the role of the user is (a) a user authorized to purchase the article or a user authorized to return the article; or (b) an employee of a store.

11. The method of claim 10 wherein the digital key is further configured to cause the locking unit to alter between the locked state and the unlocked stated based on a sub-role of the user, the sub-role comprising at least one of an associate of the store, a manager of the store, or an owner of the store.

12. The method of claim 7 wherein the first event is an initiation of a purchase of the article and the second event comprises at least one of a purchase of the article or a return of an article.

13. The system of claim 1 wherein, upon the digital key being assigned to the user based on the first event, the digital key is stored locally on the portable electronic device of the user.

14. The system of claim 1 wherein the digital key is useable only for one transaction.

15. The method of claim 7 wherein, upon the digital key being assigned to the user based on the first event, the digital key is stored locally on the portable electronic device of the user.

16. The method of claim 7 wherein the digital key is useable only for one transaction.

17. The system of claim 1:
  wherein the user is a potential purchaser; and
  wherein the second event comprises at least one of the purchase of the article, the return of the article to the locking unit, the elapsing of a predetermined amount of time, the movement outside a predetermined geographical area, or a predetermined number of uses of the digital key.

18. The system of claim 17 wherein the predetermined condition is a predetermined financial condition of the potential purchaser.

19. The system of claim 1 wherein, while the digital key is assigned to the user, the digital key is not assigned to another user.

\* \* \* \* \*